United States Patent
Catovic et al.

(10) Patent No.: US 7,643,830 B2
(45) Date of Patent: Jan. 5, 2010

(54) METHODS AND APPARATUS FOR SOFT-DECISION BASED INTER-RADIO ACCESS TECHNOLOGY HANDOVER TRIGGERING

(75) Inventors: Amer Catovic, San Diego, CA (US); Mohit Narang, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 533 days.

(21) Appl. No.: 11/488,745

(22) Filed: Jul. 17, 2006

(65) Prior Publication Data

US 2008/0014941 A1 Jan. 17, 2008

(51) Int. Cl.
*H04W 36/00* (2009.01)
(52) U.S. Cl. .................. 455/436; 455/439; 455/444; 370/332
(58) Field of Classification Search ......... 455/436–444, 455/560–561, 115.1, 524–525, 67.11–67.13; 370/331–332, 338, 310, 318
See application file for complete search history.

(56) References Cited

U.S. PATENT DOCUMENTS

| | | | |
|---|---|---|---|
| 6,615,044 B2 * | 9/2003 | Tigerstedt et al. ............ 455/437 |
| 6,845,238 B1 * | 1/2005 | Muller ........................ 455/436 |
| 6,907,245 B2 * | 6/2005 | Ohlsson et al. ............... 455/442 |
| 7,181,218 B2 * | 2/2007 | Ovesjo et al. ................ 455/436 |
| 7,372,842 B2 | 5/2008 | Kim et al. |
| 7,457,623 B2 * | 11/2008 | Naghian et al. .............. 455/439 |
| 2003/0108027 A1 | 6/2003 | Kim et al. |
| 2003/0218995 A1 * | 11/2003 | Kim et al. ................... 370/318 |
| 2005/0042987 A1 * | 2/2005 | Lee et al. .................. 455/67.11 |
| 2005/0048970 A1 * | 3/2005 | Hannu et al. .............. 455/432.2 |
| 2005/0202821 A1 * | 9/2005 | Pischella ..................... 455/436 |
| 2005/0221824 A1 * | 10/2005 | Lee et al. ................. 455/435.2 |
| 2006/0014538 A1 * | 1/2006 | Yuan ........................... 455/436 |
| 2006/0135076 A1 * | 6/2006 | Honkanen et al. ......... 455/67.13 |
| 2007/0213055 A1 * | 9/2007 | Sundberg et al. ............ 455/436 |

OTHER PUBLICATIONS

Agusti R. et al: "A Fuzzy-Neural Based Approach for Joint Radio Resource Management in a Beyond 3G Framework" Quality of Service in Heterogeneous Wired/Wireless Networks, 2004. QSHINE 2004. First International Conference on Dallas, TX, USA Oct. 18-20, 2004, Piscataway, NJ, USA, IEEE, Oct. 18, 2004, pp. 216-224, XP010744125.

(Continued)

*Primary Examiner*—Kamran Afshar
(74) *Attorney, Agent, or Firm*—Albert J. Harnois; Florin Corie

(57) ABSTRACT

Methods, apparatus, processors and computer readable medium for inter-radio access technology (RAT) handover are provided that incorporate a soft-decision making process. By implementing configurable functions, soft-decision making allows for handover measurement limits to fall within a prescribed acceptable range and for the totality of the handover measurements to be used in making a final decision on inter-RAT handover. Thus, the currently described aspects provide for more flexible handover decision-making and better utilization of network radio resources. Further, in some instances, the currently described aspects may provide for the weighting of handover measurements, thereby allowing network administrators to place more or less emphasis on a selected handover measurement and, thus, better manage the handover process.

38 Claims, 11 Drawing Sheets

OTHER PUBLICATIONS

Edwards G. et al: "A New Hand-Off Algorithim Using Fuzzy Logic" Creative Technology Transfer—A Global Affair. Proceedings of Southeastcon. Miami, Apr. 10-13, 1994, Proceedings of the Southeast Conference (Southeastcon), New York, IEEE, US, Apr. 10, 1994, pp. 1-5, XP010926744.

Hongwei Liao et al: "A Vertical Handover Decision Algorithim Bsed on Fuzzy Control Theory" Computer and Computational Sciences, 2006. IMSCCS '06. First International Multi-Symposiums on Hangzhou, Zhejiang, China April 20-24, 2006, Piscataway, NJ, USA, IEEE, Apr. 20, 2006, pp. 309-313, XP010925308.

International Search Report—PCT/US07/073700, International Search Authority—European Patent Office— Feb. 25, 2008.

Seunghyun Lee et al: "Inter-RAT Handover Technique from WCDMA Network to CDMA2000 Network" Mobile Technology, Applications and Systems, 2005 2nd International Conference on Guangzhou, China Nov. 15-17, 2005, Piscataway, NJ, USA, IEEE, Nov. 15, 2005, pp. 1-5, XP010926744.

* cited by examiner

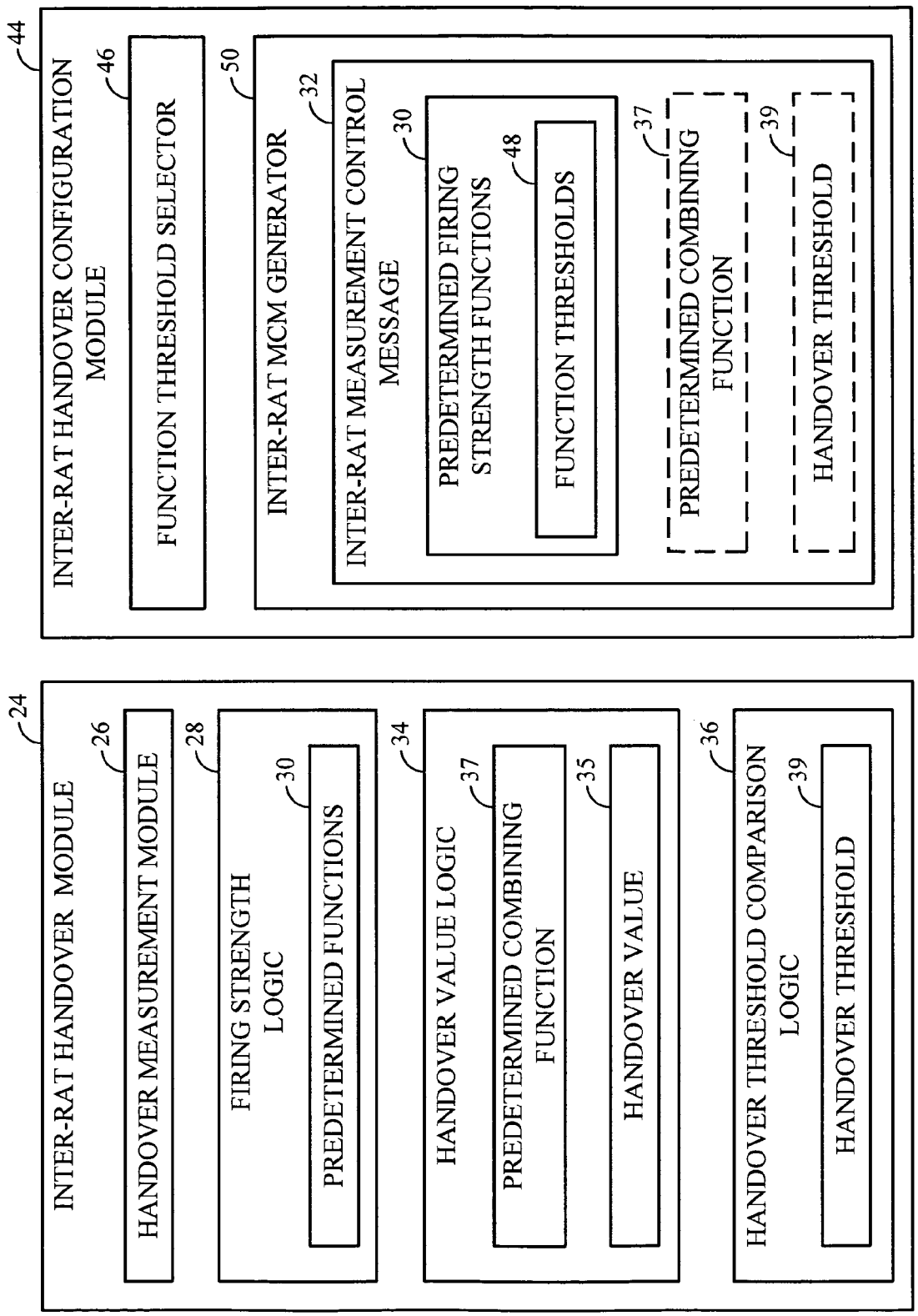

METHODS AND APPARATUS FOR SOFT-DECISION BASED INTER-RADIO ACCESS TECHNOLOGY HANDOVER TRIGGERING

BACKGROUND

The present invention relates generally to methods, apparatus, computer-readable media and processors for performing network handovers in mobile telecommunication systems, and more particularly, to methods, devices and computer program products for performing inter Radio Access Technology (RAT) handovers from a Universal Mobile Telecommunications Service (UMTS) system to a Global System for Mobile communications (GSM) system.

GSM (Global System for Mobile communication) is a digital mobile phone system utilized in Europe and other areas. GSM is a variation of TDMA (Time Division Multiple Access), which along with CDMA (Code Division Multiple Access), are the three major digital radio (wireless) phone technologies currently being used the most. GSM digitizes and compresses data, then sends it down a channel with two other streams of user data, each in its own time slot.

UMTS (Universal Mobile Telecommunications Service) is a third-generation (3G) broadband, packet-based transmission of text, digitized voice, video, and multimedia at data rates up to 2 megabits per second. Based on the GSM communication standard, UMTS is at present being employed in various geographic regions. Once UMTS is fully available geographically, users will have access through a combination of terrestrial wireless and satellite transmissions. Until UMTS is fully implemented, however, users may utilize multi-mode devices that switch to the currently available technology (such as GSM 900 and 1800) where UMTS is not yet available.

A problem arises because the technical transition from the second generation cellular system (i.e. GSM/GPRS) to the third generation mobile telephony system (i.e. UMTS) will take place step by step, probably over a number of years. As such, for the time being, many network operators feel the necessity of providing users with mobile terminals that work in both GSM/GPRS and UMTS modes. As such, a dual mode user equipment or dual mode mobile terminal that supports UMTS as well as GSM/GPRS was developed. Further, since many mobile terminal users travel from one region to another region, where different radio access technologies are covered, there is a necessity for a multi-mode mobile terminal. Thus, even though UMTS is not yet completely developed, mobile subscribers can be provided with multiple services by using dual mode mobile terminals that supports both UMTS and GSM/GPRS whenever necessary. Consequently, when they move to a region where there is no coverage provided for UMTS users, the call still can be set up on an existing network, e.g. GSM 900 or GSM 1800.

Additionally, dual-mode mobile terminals provide for a user to switch between UMTS and GSM during a call. Such switching may be required if the UMTS service is not available in a region, or if the signal is degraded such that service is inadequate. Such switching of network services during the call mode is referred to as an inter-Radio Access Technology handover, i.e., switching a channel to a new RAT network while maintaining the existing GSM/GPRS or UMTS connection.

Up until now, the decision process that a mobile terminal uses for determining whether to handover over a call from the UMTS service to the GSM service has been based on one or more monitored radio measurements meeting "hard" limits or "hard" thresholds. The term "hard" limit or threshold is utilized because the measured value of the monitored radio measurement will either trigger the handover or it will not trigger the handover. For example, during a call, the mobile terminal may monitor the state of the existing UMTS service as well as the state of a GSM service which may be available for a handover. Specifically, for the UMTS service, the mobile terminal may monitor radio measurements such as signal strength in the form of Received Signal Code Power (RSCP) and/or interference in the form of signal-to-interference ratio (Ec/No). For the GSM service, the mobile terminal may monitor the signal strength in the form of Received Signal Strength Indication (RSSI).

Currently, a single threshold is set for each monitored radio measurement and the decision on whether to handover the call to the GSM service is based on whether or not one or some combination of the thresholds are met. For example, in current handover triggering decision implementations, if one or any combination (depending on the implementation) of the UMTS measurements fall below their respective threshold, which indicates that the UMTS service has degraded below prescribed limits, and if the GSM measurement is above the respective threshold, which indicates that the GSM service is currently at an acceptable signal strength level, then triggering of a handover occurs. If one or both of the UMTS measurements are above their respective thresholds or if the GSM measurement is below the respective threshold, however, then the mobile terminal determines that the current state of the service is adequate and a handover is not triggered.

This so-called hard decision-making provides only limited flexibility in the decision process. For example, the UMTS measurements may be very close to falling below the threshold, while the GSM measurement may be well above the threshold, which would indicate strong GSM signal strength. However, in this example, under the current decision scheme, the mobile terminal would remain with the UMTS service because the UMTS service quality has not fallen below the hard threshold limits. Similarly, for example, the UMTS measurements may fall well below their respective thresholds, indicating poor UMTS service quality, while the GSM measurement is marginally below the threshold. In this example, under the current decision making scheme, the mobile terminal would remain with the UTMTS service because the GSM service is slightly below the respective threshold. The inflexibility of these hard-decision schemes is evident in that handover does not occur even though the UMTS service has degraded to an unacceptable level because the GSM service marginally fails to meet a level of acceptance, or in that the UMTS service is marginally above requisite quality levels and thus no handover occurs even though the GSM network is significantly above the level of quality required to perform a handover. This type of "go"/"no go" decision-making does not adequately address the utilization of network resources to insure optimization.

Therefore, a need exists to develop a handover decision-making process that relies on one or more soft-decisions, otherwise referred to as fuzzy logic. Soft-decisions would allow for all handover measurements to be considered relative to one another in making a handover decision. A soft-decision making process would result in a handover triggering scheme that is more flexible in terms of network management of the decision process and provides for better optimization of the use of network resources.

SUMMARY

Thus, present aspects define methods, devices, systems and computer program products for soft-decision based inter-Radio Access Technology (inter-RAT) handover triggering from a Universal Mobile Telecommunications System (UMTS) network to a Global System for Mobile (GSM) communications network. The soft-decision based handover implementation provides for the measurements used in the handover triggering decision process to have "soft" thresholds, as opposed to "hard" thresholds. "Soft" thresholds allow for each measurement to fall within a configurable range as defined by a configurable function and for the combined measurements to be the basis for determining the triggering of a handover. In addition, a weighting scheme may be applied to provide for weighting of the radio measurements. Weighting of measurements allows for the network administrator to place more emphasis on a certain measurement(s) in the triggering decision process. By weighting certain measurements the network administrator can choose to hasten or delay the handover from UMTS to GSM based on network factors. By providing for handover triggering decision-making that is based on "soft"-decisions, more flexible decision making results and better overall utilization of network resources is realized.

In one aspect, a method for triggering Universal Mobile Telecommunications Service (UMTS) to Global System for Mobile (GSM) radio access technology handover in a communication device is defined. The method includes obtaining at least one UMTS handover measurement and at least one GSM handover measurement. In this regard obtaining may involve receiving a measurement from a network device or determining the measurement at the communication device. UMTS handover measurements may include signal strength, such as Received Signal Code Power (RSCP) and signal to interference ratio, such as Energy per chip (Ec) divided by the power in the band (No). GSM handover measurements may include signal strength, such as Received Signal Strength Indication (RSSI). Once the handover measurements have been obtained, a respective configurable function is applied to each UMTS and GSM handover measurement to define a respective UMTS and GSM firing strength value. Each respective configurable function is operable to generate the respective UMTS and GSM firing strength value between a first UMTS or GSM firing strength value and a second UMTS or GSM firing strength value, such as a minimum UMTS and GSM firing strength value and a maximum UMTS and GSM firing strength value. As such, the UMTS and GSM firing strength values provide for soft-decision making. Once the UMTS and GSM firing strength have been determined, a handover value is determined using each UMTS firing strength value and each GSM firing strength value and the handover value is compared to a configurable handover threshold. If the handover value is determined to meet the configurable handover threshold, a handover signal is generated. The generated handover signal is typically communicated to a network device, such as a Radio Network Controller (RNC).

Additional aspects of the method for triggering handover will include application of a configurable weighting value assigned to each respective UMTS and GSM firing strength value, such that, the determination of the handover value uses each weighted UMTS firing strength value and each weighted GSM firing strength value. If the method does not provide for the application of weighting values, the weighting of the firing strengths may be accounted for in the respective configurable functions. Weighting of the firing strength values allows for the network administrator to prioritize the handover measurements and provide better control over the handover process.

An alternate method is defined by a computer readable medium including instructions stored thereon, comprising a first set of instructions for obtaining at least one UMTS handover measurement and at least one GSM handover measurement. The computer readable medium further comprising a second set of instructions for applying a respective configurable function to each UMTS handover measurement, and a third set of instructions for applying a respective configurable function to each GSM handover measurement, to define a respective UMTS and GSM firing strength value for each measurement. Each respective configurable function is operable to generate the respective UMTS or GSM firing strength value between a first UMTS or GSM firing strength value and a second UMTS or GSM firing strength value, such as a minimum UMTS and GSM firing strength value and a maximum UMTS and GSM firing strength value. The computer readable medium further comprising a fourth set of instructions for determining a handover value using each respective UMTS and GSM firing strength value. The computer readable medium also comprising a fifth set of instructions for comparing the handover value to a configurable handover threshold. Additionally, the computer readable medium comprises a sixth set of instructions for generating a handover signal if the handover value meets the handover threshold. In some aspects, the handover signal may be subsequently communicated to the network entity responsible for completing the handover process.

Yet another alternate aspect is defined by at least one processor device implemented in a communication device and configured to perform specified operations. The operations include obtaining at least one UMTS handover measurement and at least one GSM handover measurement and applying a respective configurable function to each UMTS and GSM handover measurement to define a respective UMTS and GSM firing strength value for each measurement. Each respective configurable function is operable to generate the respective UMTS or GSM firing strength value between a first UMTS or GSM firing strength value and a second UMTS or GSM firing strength value, such as a minimum UMTS and GSM firing strength value and a maximum UMTS and GSM firing strength value. Each respective UMTS and GSM firing strength value is used to determine a handover value and the handover value is compared to a configurable handover threshold. If the handover value meets the handover threshold, a handover signal is generated and may be subsequently communicated the network entity responsible for completing the handover process.

A further aspect is defined by a communication device. The communication device includes a computer platform including a processing engine and a memory unit. The device further includes a Radio Access Technology (RAT) handover module stored in the memory unit and executable by the processing engine. The RAT handover module includes measurement module operable for obtaining at least one UMTS handover measurement and at least one GSM handover measurement. Additionally, the RAT handover module also includes UMTS and GSM firing strength logic operable for applying a respective configurable function to each UMTS and GSM handover measurement to define respective UMTS firing strength value(s) and GSM firing strength value(s). Each respective configurable function is operable to generate the respective UMTS and GSM firing strength value between a first UMTS or GSM firing strength value and a second UMTS or GSM firing strength value, such as a minimum UMTS and GSM firing strength value and a maximum UMTS and GSM firing strength value. The RAT handover module also includes handover value logic operable for determining a handover value using each UMTS firing strength value and each GSM firing strength value. The module also includes handover threshold comparison logic operable for comparing the handover value to a configurable handover threshold.

The RAT handover module may optionally include weighting logic operable for applying a configurable weighting value to each respective firing strength value and, if weighting logic is implemented, the handover value logic uses each weighted UMTS firing strength value and each weighted GSM firing strength value to determine the handover value. Also, the RAT handover module may optionally include handover signal generator logic operable for generating a handover signal if the handover value meets the configurable handover threshold.

Yet another aspect is provided for by a communication device that includes a means for obtaining at least one UMTS handover measurement and at least one GSM handover measurement, and a means for applying a respective configurable function to each UMTS and GSM handover measurement to define a respective UMTS and GSM firing strength value for each UMTS and GSM measurement. The UMTS and GSM firing strength value may be between a first UMTS firing strength value and a second UMTS firing strength value. The device also includes a means for determining a handover value using each UMTS firing strength value and each GSM firing strength value, a means for comparing the handover value to a configurable handover threshold; and a means for generating a handover signal if the handover value meets the configurable handover threshold.

Further aspects are defined by a method for configuring Universal Mobile Telecommunications Service (UMTS) to Global System for Mobile (GSM) radio access technology handover at a network device. The method includes providing for a set of function thresholds for each of one or more UMTS handover measurements and each of one or more GSM handover measurements, generating a measurement control message (MCM) that includes the selected function thresholds and communicating the MCM to a communication device. The set of selected function thresholds are operable for application to a respective configurable function for each UMTS handover measurement and each GSM handover measurements. Additionally, the method may optionally include providing for a weighting value for each of the one or more UMTS handover measurements and each of the one or more GSM handover measurements and the inclusion of the weighting values in the MCM. The weighting values are applied to respective UMTS and GSM firing strength value that result from applying the respective configurable function to each of the UMTS handover measurement and GSM handover measurement.

A related aspect is defined by a computer readable medium including instructions stored thereon comprising a first set of instructions for providing for a set of function thresholds for each of one or more UMTS handover measurements and each of one or more GSM handover measurements. The computer readable medium further comprises a second set of instructions for generating a measurement control message (MCM) that includes the selected function thresholds. Additionally, the computer readable medium comprises a third set of instructions for communicating the MCM to a communication device, wherein the set of selected function thresholds are operable for application to a respective configurable function for each UMTS handover measurement and each GSM handover measurements.

A further related aspect is defined by at least one processor device, implemented in a network device. The one processor device is configured to perform the operations of providing for a set of function thresholds for each of one or more UMTS handover measurements and each of one or more GSM handover measurements, generating a measurement control message (MCM) that includes the selected function thresholds and communicating the MCM to a communication device. The set of selected function thresholds are operable for application to a respective configurable function for each UMTS handover measurement and each GSM handover measurements.

In yet another aspect, a network device is defined that includes a computer platform including a processing engine and a memory unit. The network device further includes a Radio Access Technology (RAT) handover module stored in the memory unit and executable by the processing engine. The RAT handover module includes a function threshold selector operable for providing a set of function thresholds for each of one or more UMTS handover measurements and each of one or more GSM handover measurements and a Measurement Control Message (MCM) generator operable for generating a measurement control message (MCM) that includes the function thresholds. The network device further includes a communications module operable for communicating the MCM to a communication device. The RAT handover module may optionally further include a weighting value selector operable for providing a weighting value for each of the one or more UMTS handover measurements and each of the one or more GSM handover measurements and, in such aspects the MCM generator is further operable for including the weighting values in the message.

Yet another aspect is provided for by a network device that includes a means for providing for a selection of a set of function thresholds for each of one or more UMTS handover measurements and each of one or more GSM handover measurements, a means for generating a measurement control message (MCM) that includes the selected function thresholds and a means for communicating the MCM to a communication device. The set of selected function thresholds are applied to a respective configurable function for each UMTS handover measurement and each GSM handover measurements.

As such, the present aspects provide for methods and devices for inter-RAT handover that incorporate a soft-decision making process. By implementing configurable functions, soft-decision making allows for handover measurement limits to fall within a prescribed acceptable range and for the totality of the handover measurements to be used in making a final decision on handover. Thus, the currently described aspects provide for more flexible handover decision-making and better utilization of network radio resources. By providing for the weighting of handover measurements, network administrators are provided the capability to place more or less emphasis on a selected handover measurement and, thus, better manage the handover process.

BRIEF DESCRIPTION OF THE DRAWINGS

FIG. 2 is a block diagram of an inter-RAT handover module for soft-decision based inter-RAT handover on a communication device, according to one aspect;

FIG. 3 is a block diagram of an inter-RAT handover configuration module for configuring soft-decision based inter-RAT handover at a network device, according to one aspect;

DETAILED DESCRIPTION

The present devices, apparatus, methods, computer-readable media and processors now will be described more fully hereinafter with reference to the accompanying drawings, in which aspects of the invention are shown. The devices, apparatus, methods, computer-readable media and processors may, however, be embodied in many different forms and should not be construed as limited to the aspects set forth herein; rather, these aspects are provided so that this disclosure will be thorough and complete, and will fully convey the scope of the invention to those skilled in the art. Like numbers refer to like elements throughout.

Figure 1:
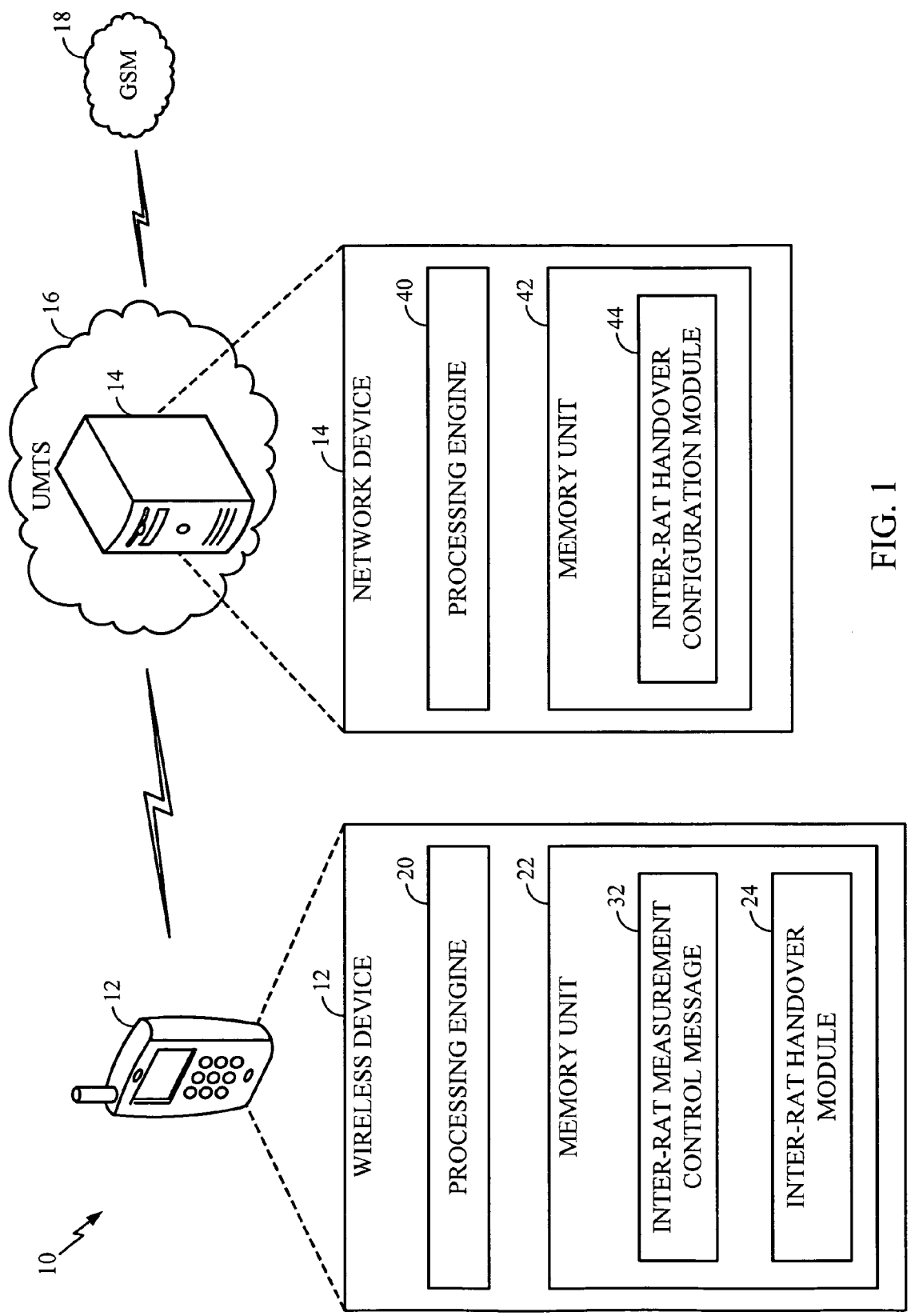
FIG. 1 is a schematic diagram of a/system for providing soft-decision based inter-RAT handover on a communication device, according to one aspect.

According to one aspect, FIG. 1 provides a schematic diagram representation of a system for providing soft-decision based inter-Radio Access Technology (RAT) handover triggering at a communication device. The system 10 may include a communication device 12 and a network device 14, such as a Radio Network Controller (RNC) that is located in the access portion of a Universal Mobile Telecommunication System (UMTS) 16. In this instance, UMTS 16 may be the originating system in which a communication call is initially connected. Further, UMTS 16 may be in communication with Global System for Mobile communication system (GSM) 18, which is the network to which the call may be transferred, i.e., handed over to, as a result of the present soft-decision based inter-RAT handover aspects.

The communication device 12 may include a processing engine 20 that is in communication with memory unit 22. The memory unit may include an inter-RAT handover module 24 executable by the processing engine 20 and operable to determine whether handover triggering is to occur between the current UMTS system 16 and the handover GSM system 18.

Referring to FIG. 2, a block diagram depiction of aspects of the inter-RAT handover module 24 is shown. The inter-RAT handover module 24 may include handover measurement module 26 operable for obtaining one or more UMTS handover measurement and one or more GSM network measurements. In one aspect, the handover measurement module 26 may include a UMTS signal strength measurement, such as Received Signal Strength Code Power (RSCP), a UMTS signal to interference ratio measurement, such energy per chip divided by power density in the band (Ec/No) and GSM signal strength, such as Received Signal Strength Indication (RSSI). It should be noted that use of RSCP, Ec/No and RSSI as handover measurements is in accordance with standard Radio Resource Protocol Specification 25.331, section 14.3 entitled Inter-RAT measurements. Radio Resource Protocol Specification 25.331 is herein incorporated by reference as if set forth fully herein. The handover measurement module 26 may obtain the measurement by monitoring radio conditions within the communication device, such as internal monitoring of UMTS signal strength and UMTS signal to interference ratio, or the measurements may be obtained by receipt of an external communication, such as an external communication that includes GSM signal strength measurements.

The inter-RAT handover module 24 may also include firing strength logic 28 operable for applying a respective configurable function 30 to each handover measurement to define a respective firing strength for the given measurement. Each configurable function 30 may be operable to generate a respective firing strength value, which may lie between a first firing strength value and/or a second firing strength value defined by handover measurement thresholds that set a minimum and/or maximum thresholds for each measurement. In some aspects, the upper and/or lower thresholds may be dynamically configurable by a network administrator or the like. For example, in some aspects, an inter-RAT measurement control message (MCM) 32 communicated to communications device 12 from the network device 14 may include the configurable functions, and the upper and/or lower thresholds, for one or more of the handover measurements.

The inter-RAT handover module 24 may also include handover value logic 34 operable for determining a handover value 35 using each of the determined firing strength values. The handover value logic 34 typically determines the handover value 35 by implementing a predetermined combining function 37, for example a mathematical computation such as summing each of the firing strength values, to generate the handover value. It should be noted, however, that other methods may be utilized to apply each respective determined firing strength value to generate a handover value to use in a handover decision.

The inter-RAT handover module 24 may also include handover threshold comparison logic 36 for comparing the handover value 35 to a handover threshold 39. The inter-RAT handover module 24 may be configured such that if the handover value 35 meets the handover threshold 39, then the UMTS to GSM handover process is triggered.

Referring again to FIG. 1, the network device 14 may include a processing engine 40 that may be in communication with memory unit 42. The memory unit 42 may include an inter-RAT handover configuration module 44 executable by the processing engine 40 and operable to provide dynamic configuration of the inter-RAT handover module 24 operable at communication device 12.

Referring to FIG. 3, a block diagram depiction of aspects of the inter-RAT handover configuration module 44 is provided. The inter-RAT handover configuration module 44 may include function threshold selector 46 operable for providing a network administrator or RNC operator with the ability to define and/or select for each monitored handover measurement a configurable function, which may include upper and/ or lower function thresholds 48, which is used to determine the respective measurement firing strength. Additionally, in some aspects, inter-RAT handover configuration module 44 may be operable to allow an operator to configure the predetermined combining function 37, and/or the handover threshold 39. The configuration module 44 may also include an inter-RAT Measurement Control Message (MCM) generator 50 operable for generating MCM 32 that includes the selected configurable functions, including the set or sets of upper and lower function thresholds 48, and which may further include the predetermined combining function 37, and/or the handover threshold 39. The MCM 32 is communicated to communication device 12 and is operable to dynamically configure a soft-decision based inter-RAT handover process within the Inter-RAT handover module 24.

Figure 4:
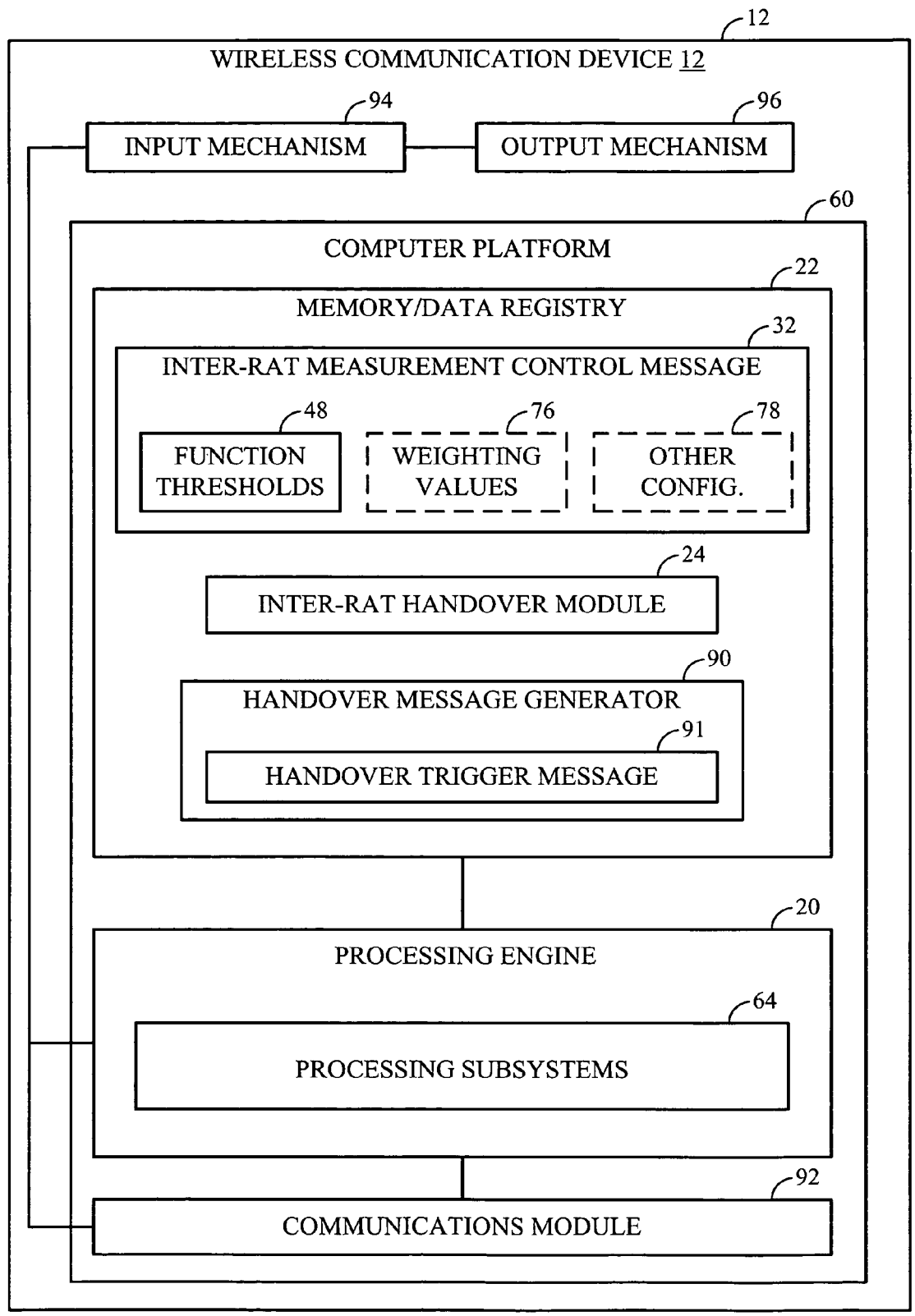
FIG. 4 is a block diagram of a wireless communication device that is operable to provide soft-decision based inter-RAT handover triggering, according to one aspect.

Referring to FIG. 4, according to one aspect, a block diagram representation of a wireless communication device 12 operable for providing soft-decision based inter-RAT handover is depicted. While the illustrated embodiment depicts a wireless device, aspects as described pertain to any communication device, wired or wireless, mobile or fixed, which is capable of communicating with both the UMTS system 16 and the GSM system 18. The communication device 12 may include any type of computerized, communication device, such as cellular telephone, Personal Digital Assistant (PDA), two-way text pager, portable computer, and even a separate computer platform that has a wireless communications portal, and which also may have a wired connection to a network or the Internet. The communication device can be a remote-slave, or other device that does not have an end-user thereof but simply communicates data across the wireless or wired network, such as remote sensors, diagnostic tools, data relays, and the like. The present apparatus and methods can accordingly be performed on any form of wireless or wired communication device or wired/wireless computer module, including a wireless communication portal, including without limitation, wireless modems, PCMCIA cards, access terminals, desktop computers or any combination or sub-combination thereof.

The communication device 12 includes computer platform 60 that can transmit data across a wireless or wired network, and that can receive and execute routines and applications and optionally display data transmitted from network device 14, such as a RNC or another computer device connected to a wireless or wired network. Computer platform 60 includes memory/data registry 22, which may comprise volatile and nonvolatile memory such as read-only and/or random-access memory (RAM and ROM), EPROM, EEPROM, flash cards, or any memory common to computer platforms. Further, memory/data registry 22 may include one or more flash memory cells, or may be any secondary or tertiary storage device, such as magnetic media, optical media, tape, or soft or hard disk.

Further, computer platform 60 also includes a processing engine 20, which may be an application-specific integrated circuit ("ASIC"), or other chipset, processor, logic circuit, or other data processing device. Processing engine 20 includes various processing subsystems 64 embodied in hardware, firmware, software, and combinations thereof, that enable the functionality of communication device 12 and the operability of the communication device on a wireless network. For example, processing subsystems 64 allow for initiating and maintaining communications, and exchanging data, with other networked devices. In present aspects, in which the inter-RAT handover module 24 relies on subsystems to generate or monitor handover measurement data, such as UMTS signal strength data, such as RSCP, UMTS signal to interference ratio data, such as Ec/No and the like, the subsystems may include, but are not limited to, requisite signal strength and interference monitoring subsystems. In aspects in which the communication device is defined as a cellular telephone the communications processing engine 20 may additionally include one or a combination of processing subsystems 64, such as: sound, non-volatile memory, file system, transmit, receive, searcher, layer 1, layer 2, layer 3, main control, remote procedure, handset, power management, digital signal processor, messaging, call manager, Bluetooth® system, Bluetooth® LPOS, position engine, user interface, sleep, data services, security, authentication, USIM/SIM, voice services, graphics, USB, multimedia such as MPEG, GPRS, etc (all of which are not individually depicted in FIG. 2 for the sake of clarity). For the disclosed aspects, processing subsystems 64 of processing engine 20 may include any subsystem components that interact with applications executing on computer platform 60.

Figure 5:
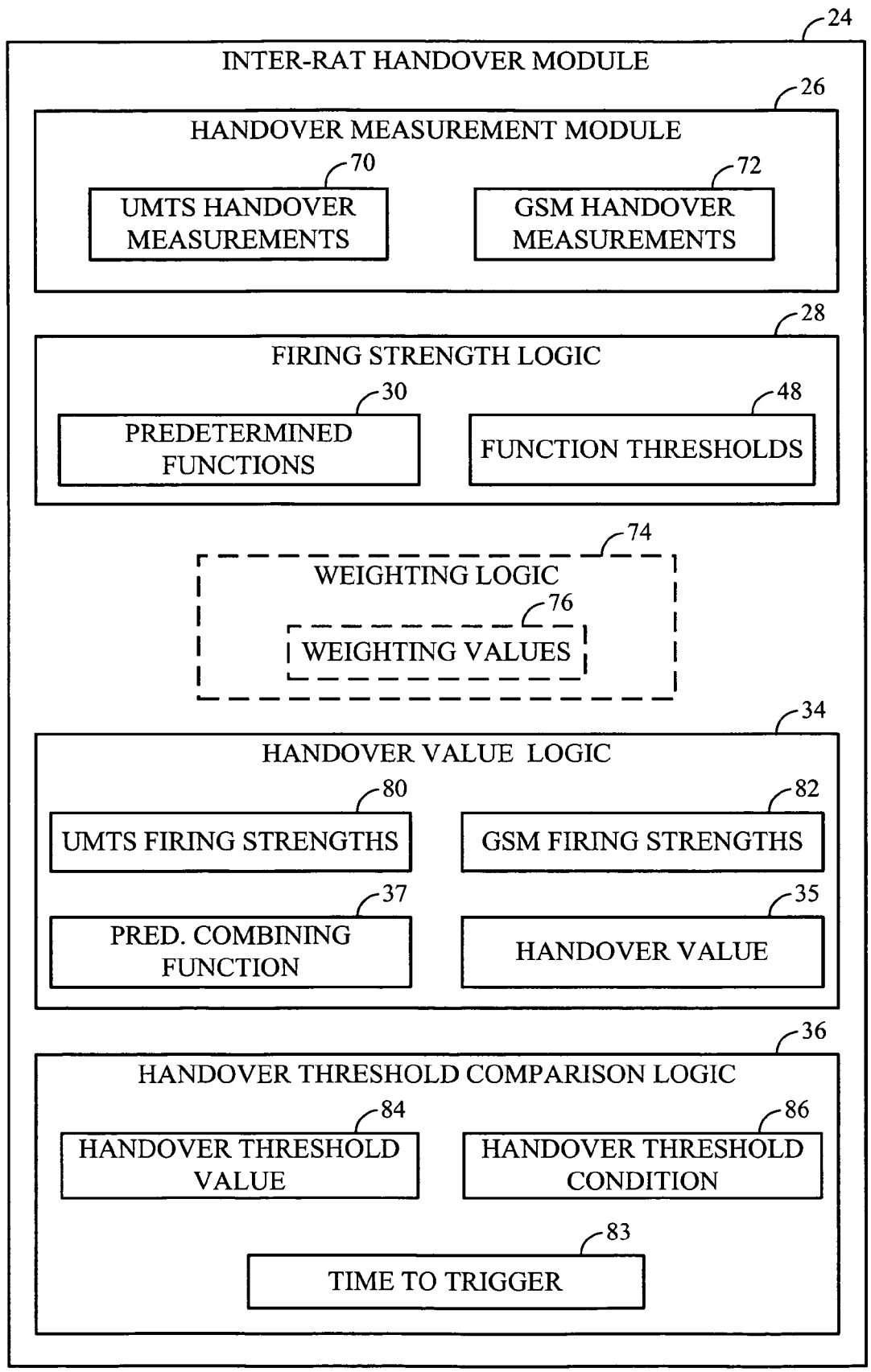
FIG. 5 is a detailed block diagram of the inter-RAT handover module of FIG. 2 including additional details, according to one aspect.

The data registry 22 of computer platform 60 includes inter-RAT handover module 24 operable for determining whether a current UMTS call should be transferred, i.e., handed over, to the GSM system. Referring to the detailed block diagram depicted in FIG. 5, in some aspects, the inter-RAT handover module includes handover measurement module 26 operable for obtaining one or more UMTS handover measurement 70 and one or more GSM network measurements 72. In one aspect, the handover measurement module 26 will include a UMTS signal strength measurement, such as Received Signal Strength Code Power (RSCP), a UMTS signal-to-interference ratio measurement, such Energy per chip divided by power density in the band (Ec/No) and GSM signal strength, such as Received Signal Strength Indication (RSSI). As previously noted the use of RSCP, Ec/No and RSSI as handover measurements is in accordance with standard Radio Resource Protocol Specification 25.331, section 14.3 entitled Inter-RAT measurements. Other UMTS and GSM measurements that provide an indication as to the quality of the service may also be used in determining handover and are within the inventive concepts herein disclosed.

The handover measurement module 26 may obtain the measurements by monitoring radio conditions within the communication device, such as internal monitoring/measuring of handover measurements. Alternatively, the handover measurements may be obtained by receipt of external communication. Typically, the communication device will be configured to enter into a compressed mode in order for the communication device to be able to allocate time to tune away from UMTS system 16 and measure the GSM measurements, such as RSSI.

The inter-RAT handover module also includes firing strength logic 28 operable for applying a respective configurable function 30 to each of the obtained UMTS and GSM handover measurements 70 and 72 to define a respective firing strength value. As opposed to the prior art inter-RAT handover schemes, which provide for the handover measurements to be compared to a single threshold and assigned a firing strength of "0" or "1" depending on whether the handover measurement falls below or above the threshold, in the present aspects each configurable function 30 is operable to generate a respective firing strength value between a first firing strength value and a second firing strength value. The first and second firing strength values will be defined by function thresholds 48 that set an minimum and maximum threshold for each measurement.

For example, in one non-limiting aspect, if the UMTS handover measurement is RSCP, then the lower function threshold may be −110 dBm and the upper threshold may be −100 dBm. If the UMTS measurement is below −110 dBm, the defined firing strength value may be "0" and if the UMTS measurement is above −100 dBm, the defined firing strength value may be "1". However, in accordance with the present aspects, if the UMTS measurement is between −110 dBm and −100 dBm, then the configurable function 30 is applied and a resulting firing strength between "0" and "1" is defined. The configurable function 30 may be defined by any line, curve, and/or any combination thereof. Further, the configurable function 30 may be expressed in any manner, such as a sloped linear binary equation, a non-linear binomial equation, logarithmic function, etc.

In some aspects, the configurable function 30 and/or the upper and/or lower function thresholds 48 may be dynamically configurable by a network administrator or the like. As such, in some aspects, an inter-RAT measurement control message 32 communicated from the network device 14 during the call may include a set of one or more of the configurable function 30, the upper and the lower function thresholds 48 for one or more of the handover measurements. Dynamic configuration of the configurable function and/or the upper and/or lower function thresholds provides the network administrator the ability to manage the overall handover process and provide priority to one or more handover measurements in the handover decision-making process.

The inter-RAT handover module may optionally include weighting logic 74 operable for applying a weighting value 76 to one or more of the defined firing strengths. Application of a weighting value to the defined firing strength provides for greater or lesser emphasis to be placed on one or more handover measurements, relative to the other handover measurements, in determining whether a handover should be triggered. For example, in one non-limiting aspect, if the UMTS measurements are assigned weighting values of "1" and the GSM measurements are assigned weighting values of "4", the GSM measurements are said to be 4 times more significant in the overall handover determination process. It should be noted that the value of the weight applied to each measurement is not limited, and any weighting scheme may be utilized. As such, by implementing weighting values, network administrators are able to manage the overall handover process.

Similar to the function thresholds 48, the weighting values may be dynamically configured by a network administrator or the like. As such, in some aspects, the inter-RAT MCM 32 communicated from the network device 14 during the call may optionally include one or more weighting values 76 respectively applied to one or more firing strengths. Dynamic configuration of the weighting values provides the network administrator the ability to manage the overall handover process and better allocate network radio resources, taking into account current network load or other network factors. In addition to the MCM including function thresholds 48 and optional weighting values 76, the MCM may optionally include other configuration data 78 related to the UMTS to GSM handover decision-making process.

The inter-RAT handover module 24 also includes handover value logic 34 that is operable for applying the predetermined combining function 37 to each of the UMTS firing strengths 80 and GSM firing strengths 82 to generate in a handover value 35. In some aspects, the predetermined combining function 37 will include summing each of the UMTS and GSM firing strength 80 and 82 resulting in a summed handover value. In aspects in which the firing strengths are weighted, the mathematical computation will be applied to each weighted UMTS and GSM firing strengths to result in the handover value. It should be noted, however, that predetermined combining function 37 may include any scheme to provide a relative assessment of one or more handover measurements in order to generate an overall handover value. Further, it should be noted that any one or any combination of the respective configurable functions 30, the weighting values 76, and the predetermined combining function 37 may include normalizing factors such that handover value 35 may fall within a predetermined range for comparison with handover threshold value 84.

Additionally, the inter-RAT handover module 24 includes handover threshold comparison logic 36 operable for comparing the handover value to a threshold to determine whether handover should be triggered. The threshold includes a threshold value 84 and a threshold condition 86. The threshold value may be a numeric value, for example, a value that defines a limit associated with whether handover should be triggered. For example, the threshold value may be defined as 0.5 and handover values below 0.5 may not trigger handover and handover values equal to and above 0.5 may trigger handover. The threshold conditions may include "less than," "greater than", "equal to," "less than and equal to," "greater than and equal to" or the like. The threshold values and conditions may be hard coded in the inter-RAT module 24 or they may be defined by a configuration that occurs at the network administrator level, such as via the MCM. For the sake of clarity, the term "meets" a threshold is used herein to define the instance in which a measured value exceeds, equals or falls short of the predefined value, depending on the given threshold condition.

Once threshold comparison logic 36 determines that the threshold has been met, an optional determination is made as to whether the threshold has been continuously met during a Time to Trigger (TTT) period 83. Use of the TTT period 83 is to avoid triggering a handover based on a short downward spike in UMTS signal strength and/or signal to interference ratio. The TTT 83 is the time during which the conditions for triggering handover must be fulfilled in order for the communication device to report the triggering event to the network device 14. For example, if TTT is set to zero, then the first occurrence of the threshold being met will trigger the handover and a communication will be sent to the network device 14. However, if the TTT is set to 3 seconds, then the handover threshold must be met for a three second period in order for handover to be triggered and a communication sent to the network device 14.

The inter-RAT handover module also may include a handover message generator 90 for generating a triggering message 91 if the threshold comparison logic 36 determines that the threshold has been met and, thus, that handover should be triggered. The generated triggering message 91 is sent to the network device 14, which subsequently contacts the GSM 18 to begin the GSM configuration process. As defined within the Radio Resource Protocol Specification 25.331, in some aspects, the triggering message 91 may include an "event 3a" notification, which as defined in the specification notifies the network device that conditions have been met at the communication device that require handover of the call from the UMTS 16 to the GSM 18.

Referring again to FIG. 4, as previously noted, computer platform 90 may further include a communications module 92 embodied in hardware, firmware, software, and combinations thereof, that enables communications among the various components of the communication device 12, as well as between the communication device 12 and a wired or wireless network. The communication module may include the requisite hardware, firmware, software and/or combinations thereof for establishing a wireless or wired network communication connection. The communication module 90 is operable for communicating the handover triggering communication, such as an "event 3a" notification, to the network device 14.

Additionally, communication device 12 has input mechanism 92 for generating inputs into communication device, and output mechanism 94 for generating information for consumption by the user of the communication device. For example, input mechanism 92 may include a mechanism such as a key or keyboard, a mouse, a touch-screen display, a microphone, etc. In certain aspects, the input mechanisms 92 provides for user input to activate an application on the communication device. Further, for example, output mechanism 94 may include a display, an audio speaker, a haptic feedback mechanism, etc.

Figure 6:
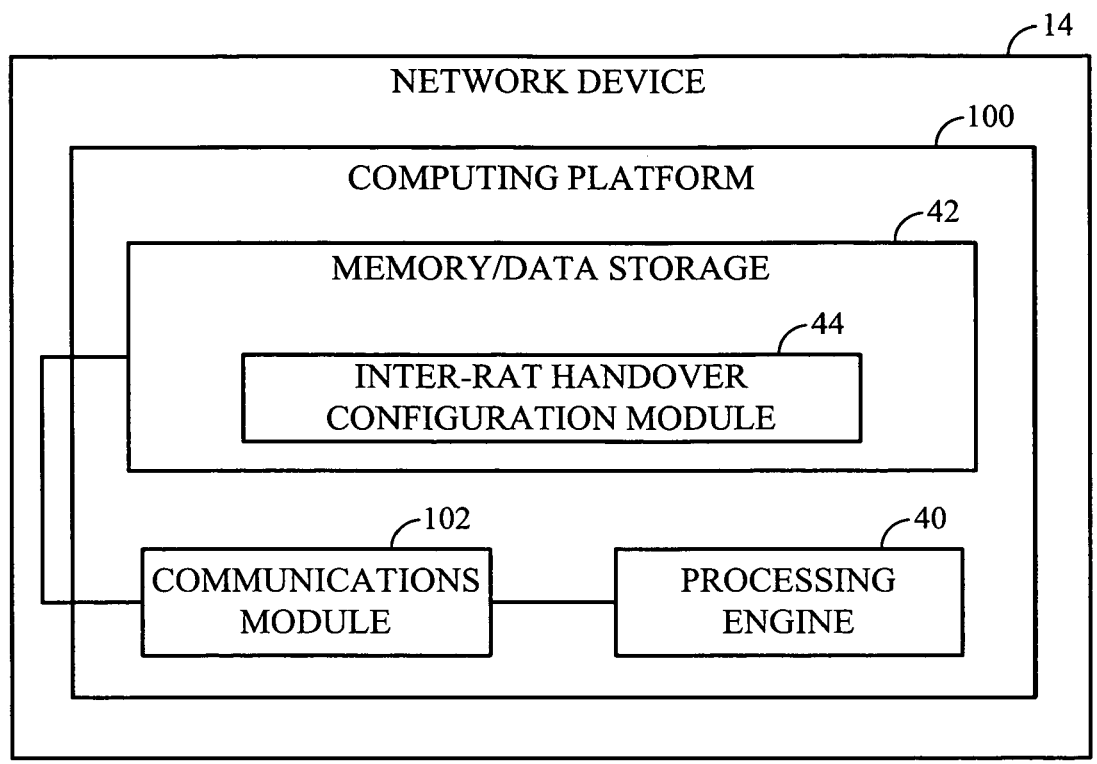
FIG. 6 is a block diagram of a network device that is operable to configure a soft-decision based inter-RAT handover on a communication device, according to one aspect.

Referring to FIG. 6, according to another aspect, a block diagram is illustrated of a network device 14, such as a radio network controller. The network device may comprise at least one of any type of hardware, server, personal computer, mini computer, mainframe computer, or any computing device either special purpose or general computing device. Further, the modules and applications described herein as being operated on or executed by the network device 14 may be executed entirely on the network device 14 or alternatively, in other aspects, separate servers or computer devices may work in concert to provide data in usable formats to parties, and/or to provide a separate layer of control in the data flow between the communication device 12 and the modules and applications executed by network device 14.

The network device 14 has computer platform 100 that can transmit and receive data across a wired or wireless network, and that can execute routines and applications. Computer platform 100 includes a data storage 42, which may comprise volatile and nonvolatile memory such as read-only and/or random-access memory (RAM and ROM), EPROM, EEPROM, flash cards, or any memory common to computer platforms. Further, data storage 42 may include one or more flash memory cells, or may be any secondary or tertiary storage device, such as magnetic media, optical media, tape, or soft or hard disk. Further, computer platform 100 also includes a processing engine 40, which may be an application-specific integrated circuit ("ASIC"), or other chipset, processor, logic circuit, or other data processing device. The computer platform 100 may further include a communications module 102 embodied in hardware, firmware, software, and combinations thereof, that enables communications among the various components of the network device 14, as well as between the network device 14 and a wireless or wired network. For example, in the described aspects, the communication module is configured to communicate to the communication device the MCM 32 and a Physical Channel Reconfiguration (PCRC) message 104 and communicate a handover request to the GSM 18. In addition, the communication module 102 is configured to receive event notifications from the communication device, such as a service degradation notice ("event2d2d"), a handover trigger notice 91 (which may include "event 3a") or the like. Also, the communications module will be configured to receive configuration data from the GSM 18, upon communication of a handover request. The communication module may include the requisite hardware, firmware, software and/or combinations thereof for establishing a wireless or wired communication connection.

Figure 7:
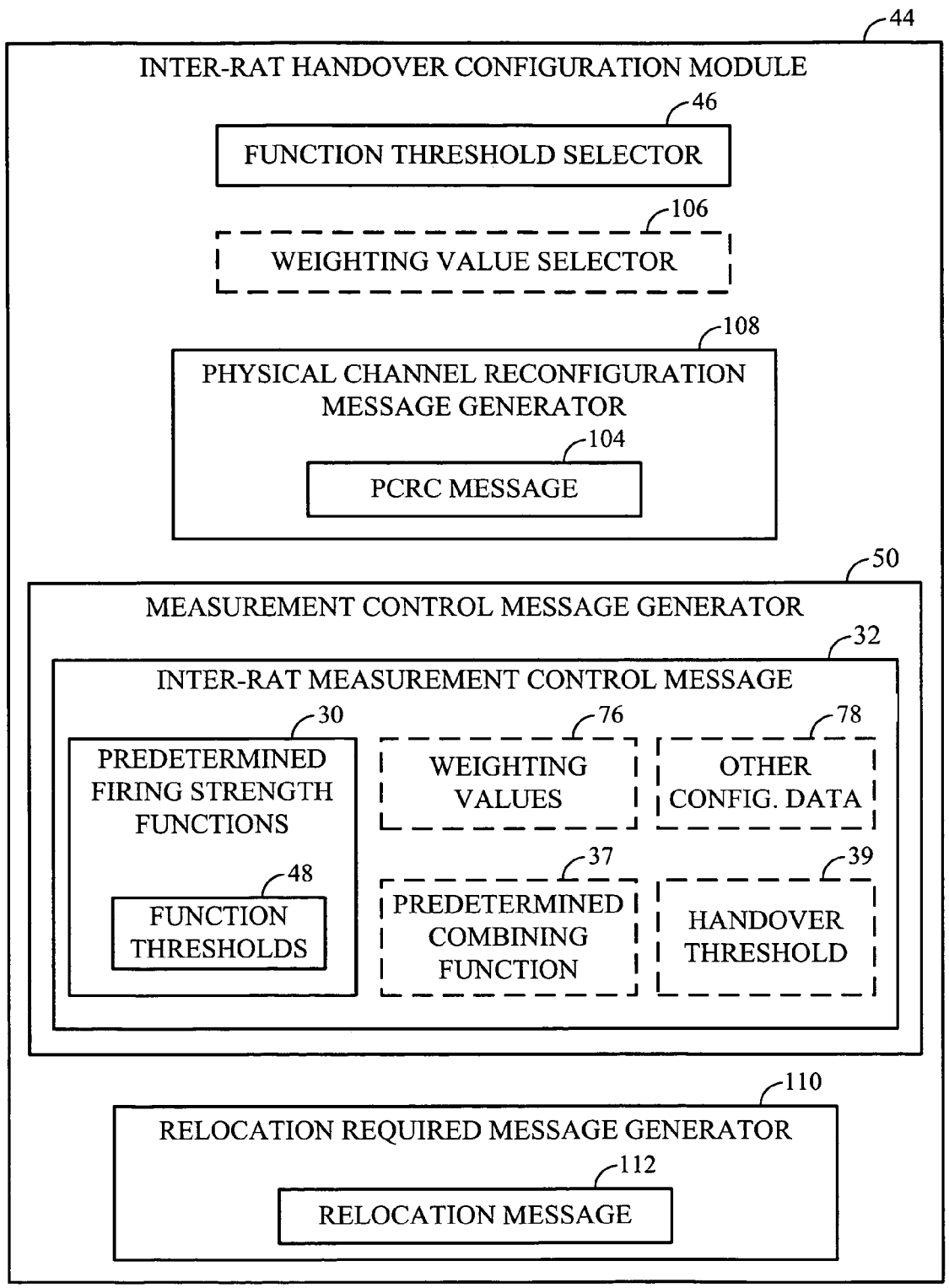
FIG. 7 is a detailed block diagram of the inter-RAT handover configuration module of FIG. 3, according to one aspect.

The data storage 132 of the network device includes an inter-RAT handover configuration module 44 operable for configuring the handover module 24 operable on the communication device 12 and initiating the handover between the UMTS 16 and the GSM 18. Referring to FIG. 7 a detailed block diagram of the inter-RAT handover configuration module 44 is provided. The inter-RAT handover configuration module 44 includes function/threshold selector 46 which may be operable to provide a network administrator or RNC operator the ability to define and/or select one or any combination of the configurable function 30, the upper and/or lower function thresholds 48 for a respective configurable function, the predetermined combining function 37, and the handover threshold 39. In addition, in those aspects that utilize weighting values in the handover decision process, the configuration module 44 may optionally include a weighting value selector 106 which may be operable to provide a network administrator or RNC operator the ability to select one or more weighting values 76, which are applied to the firing strengths during the handover decision process.

The configuration module 44 also includes a PCRC message generator 108 that is operable for generating a PCRC message 104 in response to a UMTS service degradation notification, defined in the Radio Resource Protocol Specification 25.331 as an "event2d". The PCRC message will include will compressed mode configuration data and, optionally, prompts to activate the compressed mode.

The configuration module 44 also includes an inter-RAT Measurement Control Message (MCM) generator 50 operable for generating MCM 32 that includes one or any combination of the defined or selected configurable functions 30, the upper and/or lower function thresholds 48, the predetermined combining function 37, and the handover threshold 39. Optionally, MCM generator 50 may prompt the communication device to activate the compressed mode in order to initiate measurement of GSM handover measurements. In addition to the function thresholds 48, the MCM 32 may include optional selected weighting values 76 and/or optional additional handover module configuration data 78. As previously discussed, the MCM 32, which is communicated to the communication device 12 during an ongoing call, provides for dynamic configuration of handover module parameters, such as functions, thresholds, weighting values and the like.

The configuration module 44 also includes a relocation message generator 110 operable for generating a relocation message 112, which is sent to the GSM 18, upon receipt of a trigger message 91, such as an "event 3a", from the communication device. In response to communication of the relocation message 112, the GSM 18 will send the network device 14 GSM configuration data, such as channel details and the like, and the configuration data and a handover command is subsequently communicated to the communication device to carry out the handover and establish communication on the GSM.

Figure 8:
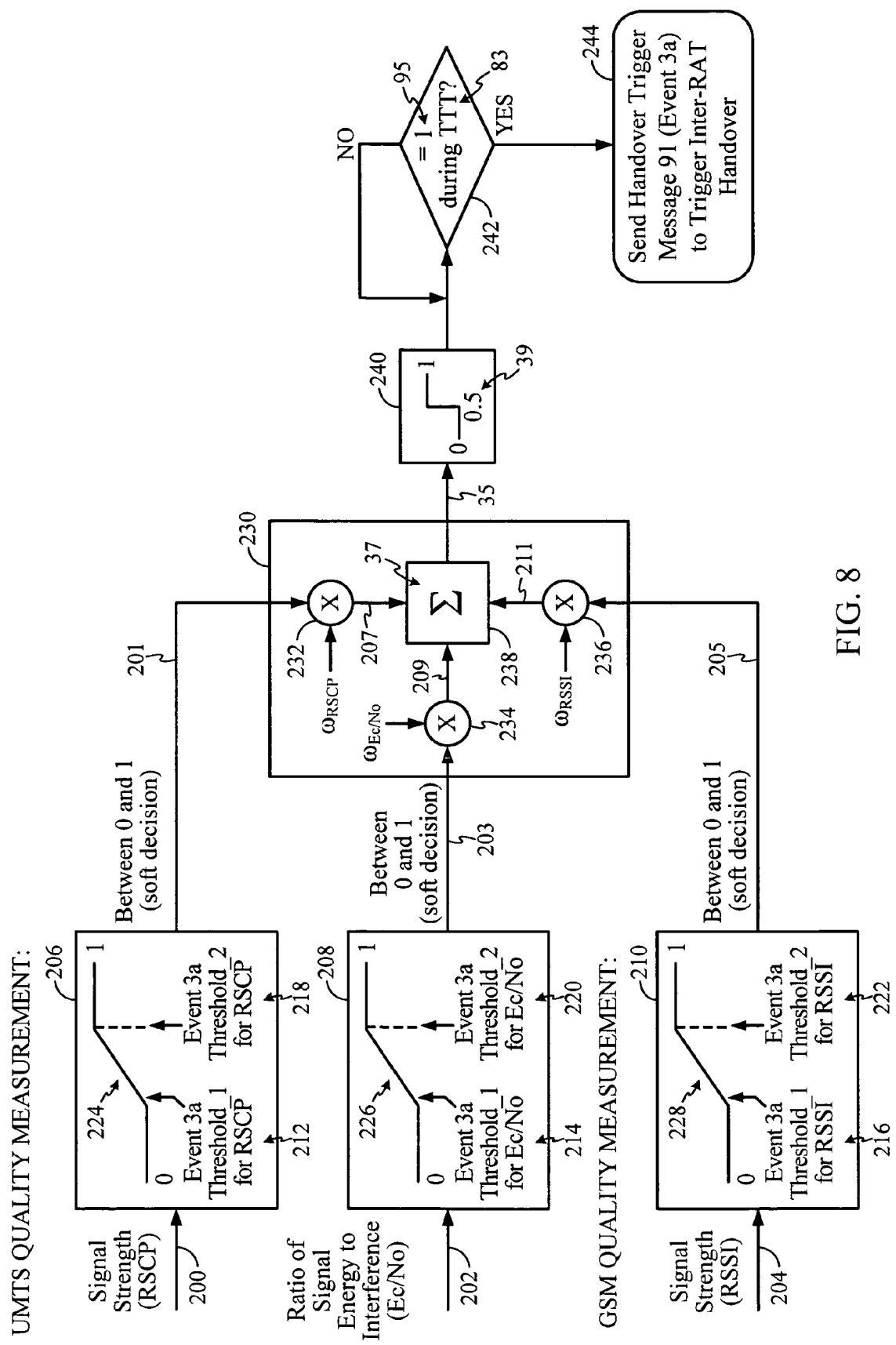
FIG. 8 is a block diagram representing a method for soft-decision based inter-RAT handover, according to one aspect.

FIG. 8 provides an illustration of a block diagram example of a method for soft-based decision handover triggering, in accordance with one aspect. Arrows 200, 202 and 204 signify the input of handover measurements into configurable soft-decision based functions to define a respective firing strength 201, 203 and 205. Specifically, arrow 200 signifies the input of the UMTS signal strength measurement, RSCP; arrow 202 signifies the input of the UMTS interference-to-signal ratio measurement, Ec/No; and arrow 204 signifies the input of the GSM signal strength measurement, RSSI. As previously noted, the handover measurements may be obtained by monitoring the radio conditions at the communication device or receiving external communications from a network device.

Blocks 206, 208 and 210 signify the firing strength determining event for RSCP, Ec/No and RSSI. The firing strength is defined by applying a configurable function 224, 226 and 228 to the respective input measurement, i.e. the RSCP measurement, the Ec/No measurement and the RSSI measurement. Each configurable function may include a lower function threshold 212, 214 and 216 and/or a respective upper function threshold 218, 220 and 222. As previously noted, the respective function thresholds may be dynamically configured at the RNC, for example during an ongoing call, to allow a network administrator to manage the handover process, balance network loads and provide maximization of radio network resources.

In the illustrated block diagram of FIG. 4, the configurable functions 224, 226 and 228 are depicted as linear equation functions. However, the configurable functions may characteristically include one or any combination of a sloped linear function or a non-linear function. Additionally, the configurable function that is applied to any handover measurement may differ from the function applied to another measurement, or the functions may be equivalent. The configurable functions 224, 226 and 228 are operably defined as being capable of providing a firing strength value between the lower function threshold 212, 214 and 216 and the upper function threshold 218, 220 and 222. Thus, in the illustrated aspect, if the lower threshold corresponds to a firing strength value of "0" and the upper threshold corresponds to a firing strength value of "1", the firing strength may be defined as a value between "0" and "1", if the measurement falls between the lower function threshold and the upper function threshold.

At block 230, the resulting firing strength values 201, 203 and 205 are used to determine a handover value. Optionally, a weighting value 232, 234, and 236 may be applied to each firing strength value 201, 203 and 205 to generate respective weighted firing strength values 207, 209 and 211 for each handover measurement. Specifically, an RSCP weighting value 232, an Ec/No weighting value 234 and a RSSI weighting value 236 may be applied as a means of prioritizing the handover measurements in the decision-making process. As previously noted, the weighting values may be dynamically configured during an on-going call to allow a network administrator to manage the handover process, balance network loads and provide maximization of radio network resources. In those aspects in which separate weighting values are not implemented, the respective configurable function for each handover measurement may take into account the necessary prioritization of handover measurements. In other words, the weighting value may be built into one or more of the respective configurable functions. At block 238, either the unweighted firing strength values 201, 203 and 205 or the weighted firing strength values 207, 209 and 211 are applied to the predetermined combining function 37 to generate the handover value 35. In the illustrated aspect, the weighted firing strength values are summed to provide for the handover value. However, predetermined combining function 37 may include any other mathematical computations as required to provide for a handover value.

At block 240, the handover value 35 is compared to a handover threshold 39 in order to determine if the combination of the existing-RAT signal quality and the handover-RAT signal quality result in a situation in which the call should be handed over. In the illustrated aspect, the handover threshold 39 is defined as "0.5". Thus, in this case, any handover value 35 above "0.5" will generate a handover trigger value 93 of "1" to represent that handover is appropriate, while any handover value 35 below "0.5" will generate a handover trigger value of "0" to represent that handover is not appropriate. Configuration of the inter-RAT handover module may provide for handover values equal to 0.5 to represent that handover is appropriate or configuration may provide for handover values equal to 0.5 to represent handover is not appropriate. At decision block 242, a determination is made as to whether the handover trigger value 93 is equal to a configurable triggering value 95 that would trigger a handover, i.e. a value of "1" in this case, and if the appropriate handover trigger value 93 has occurred within a Time To Transfer (TTT) 83 window. In this aspect, handover only occurs if the handover trigger value occurs for the defined TTT. Thus, if TTT is defined as 10 seconds, the handover trigger value must occur for 10 seconds before the communication device will prompt the RNC to initiate the handover. However, if the TTT is set to zero, a single occurrence of the handover trigger value will provide for the communication device to prompt the RNC to initiate the handover. It should be noted that the signal quality determination process defined by FIG. 4 may occur continuously or at predetermined intervals, and thus each instance of a signal quality measurement within the TTT must result in a handover trigger value 93 meeting the configurable triggering value 95 in order to trigger the inter-RAT handover. Further, one or any combination of the handover threshold 39, configurable triggering value 95 and TTT 83 may be dynamically configured to allow a network administrator to manage the handover process, balance network loads and provide maximization of radio network resources. If the configurable handover trigger value has not occurred for the set TTT period, then the handover module will continue to monitor and measure signal quality and compute new handover trigger values. If the configurable handover trigger value has occurred for the prescribed TTT period, then at Block 244, the communication device will send a handover trigger message 91, such as an "Event 3a" handover request, to the RNC.

Figure 9:
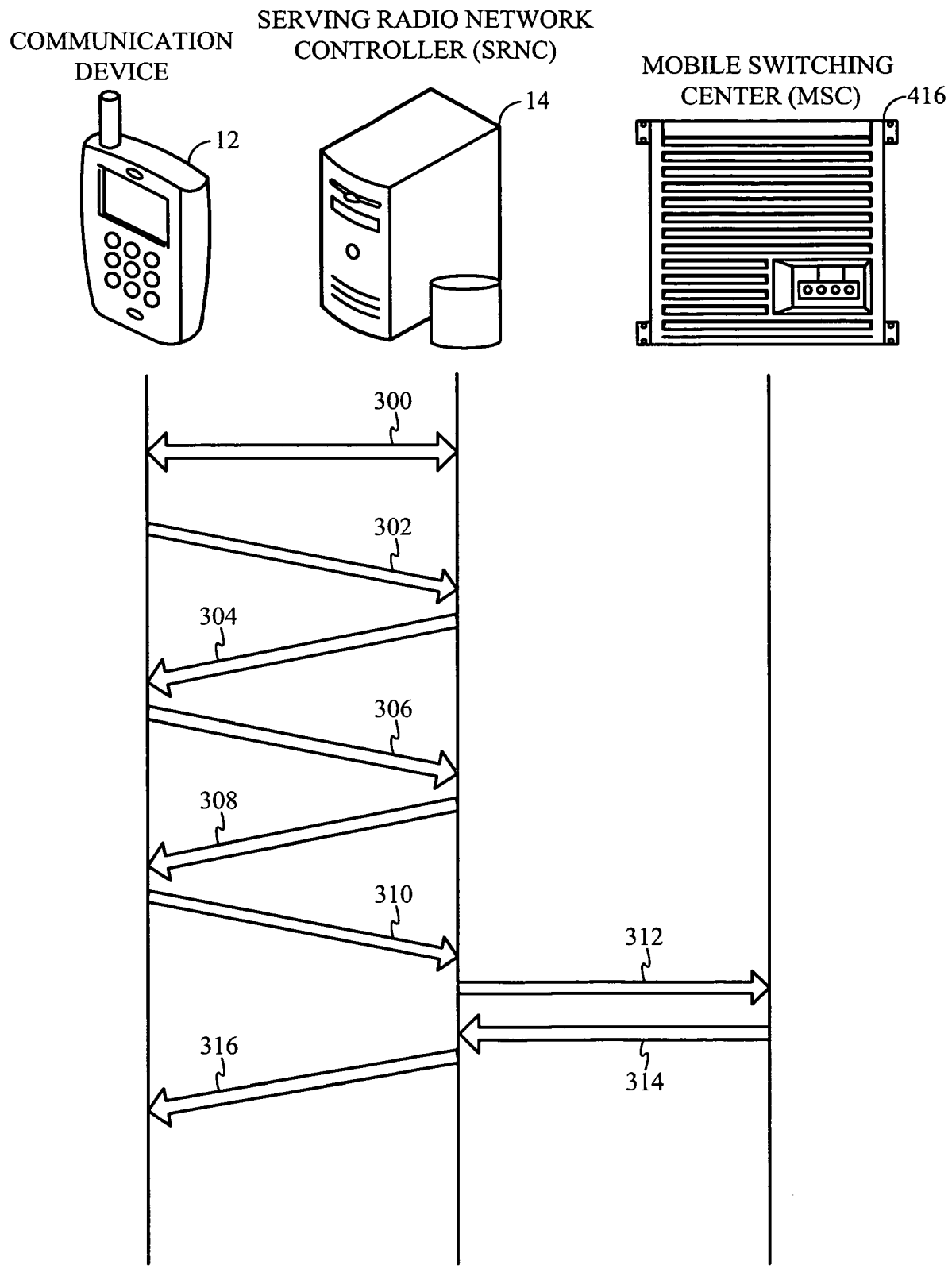
FIG. 9 is a message flow diagram of a method of configuring soft-decision based handover measurements at a network device, according to one aspect.

FIG. 9 provides a message flow illustration of a method for configuring a communication device for soft-based decision handover triggering, in accordance with an aspect. At Event 300, the communication device 12 is in an ongoing call using the UMTS service and voice data, video data, or any other downloadable data is communicated to and from the device 12 and the UMTS RNC 14. While the ongoing call ensues, the communication device, which monitors UMTS service quality performance, indicates that the device is currently experiencing a degradation in UMTS service quality. For example, signal strength may have decreased below an acceptable threshold and/or signal to interference ratio may have occurred above an acceptable threshold. At Event 302, the wireless device 12 sends a message to the RNC 14 that indicates that the device is in weak or degraded UMTS service. In some aspects, in accordance with Radio Resource Protocol Specification 25.331, an "event e2d" message may be sent that indicates the weak or degraded UMTS service.

In response to the notification of weak or degraded UMTS service, the RNC 14 generates and, at Event 304, communicates a Physical Channel Reconfiguration (PCRC) Message to the communication device 12. The PCRC message configures the compressed mode at the communication device for the monitoring of external GSM service performance. Configuration of the compressed mode may include configuring the compressed mode gaps, such as duration of a gap, frequency of gaps, separation of gaps and the like. Additionally, the PCRC message may include a prompt to activate the compressed mode, although activation may also be prompted within the subsequently communicated Measurement Control Message (MCM). At Event 306, once the communication device 12 has configured the compressed mode, a message may be sent to the RNC 14 that confirms the compressed mode configuration.

At Event 308, the RNC 14 generates and communicates to the wireless device a MCM. The MCM may activate the compressed mode, if the previously sent PCRC message did not prompt the activation of the compressed mode. Additionally, the MCM message may provide for dynamic configuration of the handover module parameters, such as a function/threshold for a given handover measurement, the weighting values assigned to the firing strengths, etc. Dynamic configuration of the handover module parameters allows the network administrator to manage the handover triggering process and provide better overall utilization of network radio resources.

At Event 310, the handover module operable at the communication device 12 has determined that a handover for UMTS to GSM should be triggered. As such, the communication device sends a handover trigger message to the RNC 14. In some aspects, in accordance with Radio Resource Protocol Specification 25.331, a Measurement Report Message (MRM) may be sent that includes an "Event3a", which indicates triggering of the handover. In response to the handover triggering message, the RNC 14 will generate and, at Event 312, communicate a relocation required message to an Mobile Switching Center (MSC) 416 (FIG. 6) located in the core network 406 (FIG. 6) of the UMTS 16 (see FIG. 6 for identification and description of 400 series designators).

In response to the relocation request message, at Event 314, the MSC will send a relocation command to the RNC 16 that includes the GSM configuration data, such as channel details and the like. In the detailed aspect, the MSC is shared by both the UMTS and the GSM, however, in alternate aspects, the UMTS and GSM may have separate MSCs. At Event 316, upon receipt of the relocation command message, the RNC sends a handover command to the wireless device that includes the GSM configuration data and subsequent handover to the GSM network occurs.

Figure 10:
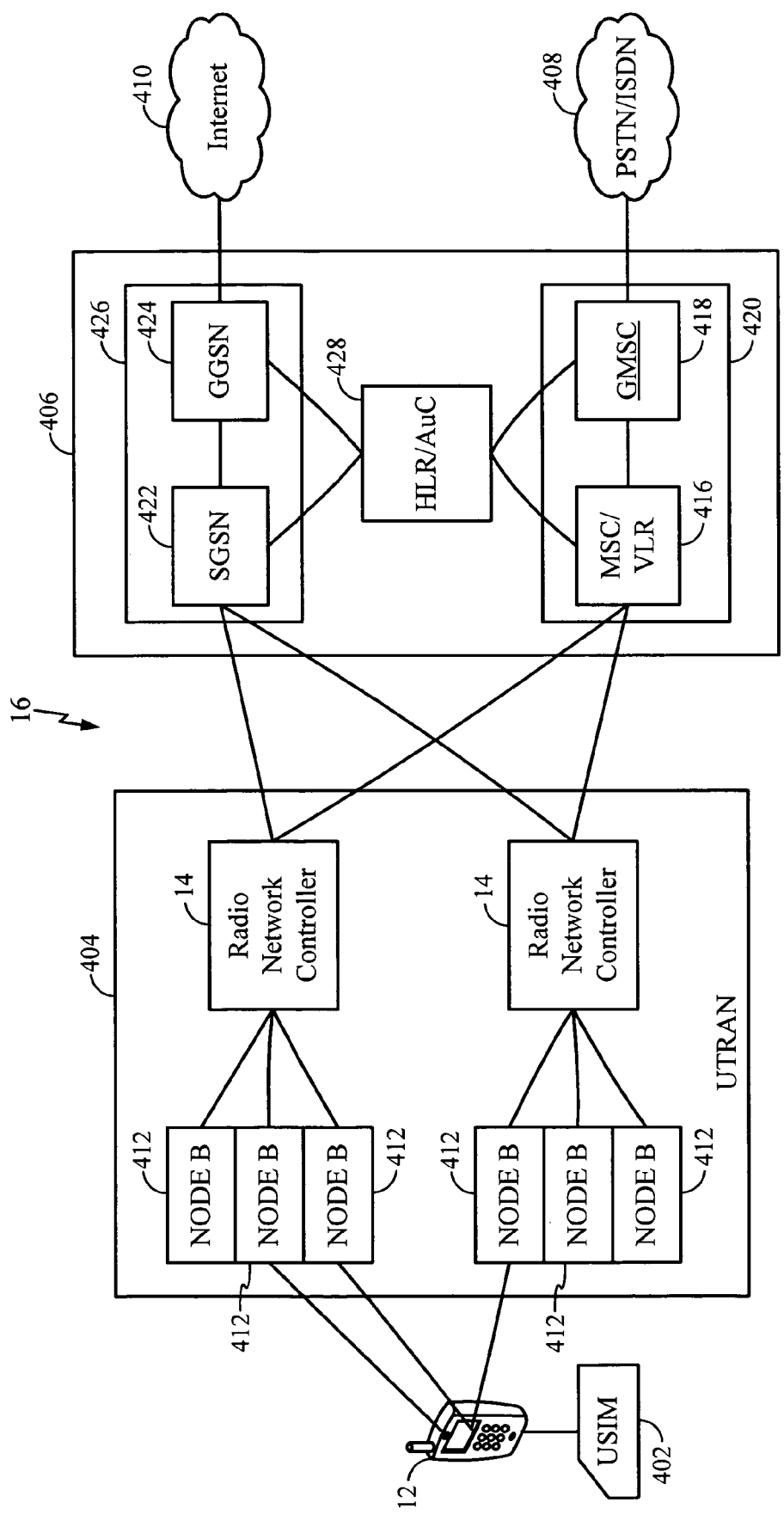
FIG. 10 is a schematic diagram of a communication network including a Universal Mobile Telecommunications System (UMTS) system and Global System for Mobile communications (GSM) system, according to one aspect.

FIG. 10 illustrates a schematic diagram of a Universal Mobile Telecommunications System (UMTS) network 400 including an access network 402 and a core network 406, which is shared between the UMTS and the GSM. The network 400 includes multiple communication devices, such as a wireless communication device 12 that includes a User Subscriber Identity Module (USIM) 402, which includes the device user's subscription information. The network 400 also includes an access network 404, which includes all of the radio equipment necessary for accessing the network. In the illustrated embodiment the access network is Universal Terrestrial Radio Access Network (UTRAN), although other access networks, such as GSM-EDGE Radio Access Network (GERAN) may also be used. The network also includes a core network 406 that includes all of the switching and routing capability for connecting the system to either a Public Switched Telephone Network (PSTN) 408 for circuit-switched calls or a Packet Data Network, such as the Internet 410 for packet-switched calls. The core network also may include switching and routing capability for mobility and subscriber location management, as well as, authentication services. As depicted the core network is shared between the UMTS and the GSM; however, as previously noted, in alternate aspects the UMTS and the GSM may have separate core networks.

The access network 404 will include a plurality of Node B 412 locations that are responsible for radio transmission/reception in one or more cells to and from the communication device 12. Each Node B 412 may include up to six cells, typically including three cells. As illustrated, the communication device 12 may be in wireless communication with multiple Node B's 412 at any one time, which illustrates the concept of soft handover, where the communication device changes its Pseudo Noise (PN) spreading code when handing over from one base station to the next while the frequency channel remains the same. Within the access network 402 multiple Node B's 410 are in communication with a Radio Network Controller (RNC) 414, which is responsible for controlling the use of the radio resources.

The core network 406 for UMTS 400 supports both circuit-switched (CS) and packet-switched (PS) operation. The Mobile Switching Center (MSC)/Visitor Location Register (VLR) 416 and Gateway Mobile Switching Center (GMSC) 418 form the Circuit-Switch (CS) domain 420, which is in communication with wireline telephone switching network PSTN/ISDN 408. The Serving General Packet Radio Service Support Node (SGSN) 422 and the Gateway General Packet Radio Service Support Node (GGSN) 424 form the Packet-Switched domain 426, which is in network communication with the Internet 410. Both domains 420 and 426 share a common Home Location Register/Authentication Center (HLR/AuC) 428. The HLR/AuC 428 provides for a database for storing user subscription and identity information, as well as verifying the identity of a user.

In the CS domain 420, the MSC 416 is the circuit switch that serves the communication device 12 based on the device's current location, and the VLR 416 provides a database that caches user information at the MSC. The GMSC 418 provides circuit switching at the user's resident or "home" location. In the PS domain 426, the SGSN 422 provides a router for packet-switched calls and the GGSN 424 provides routing at the user's resident or "home" location.

Figure 11:
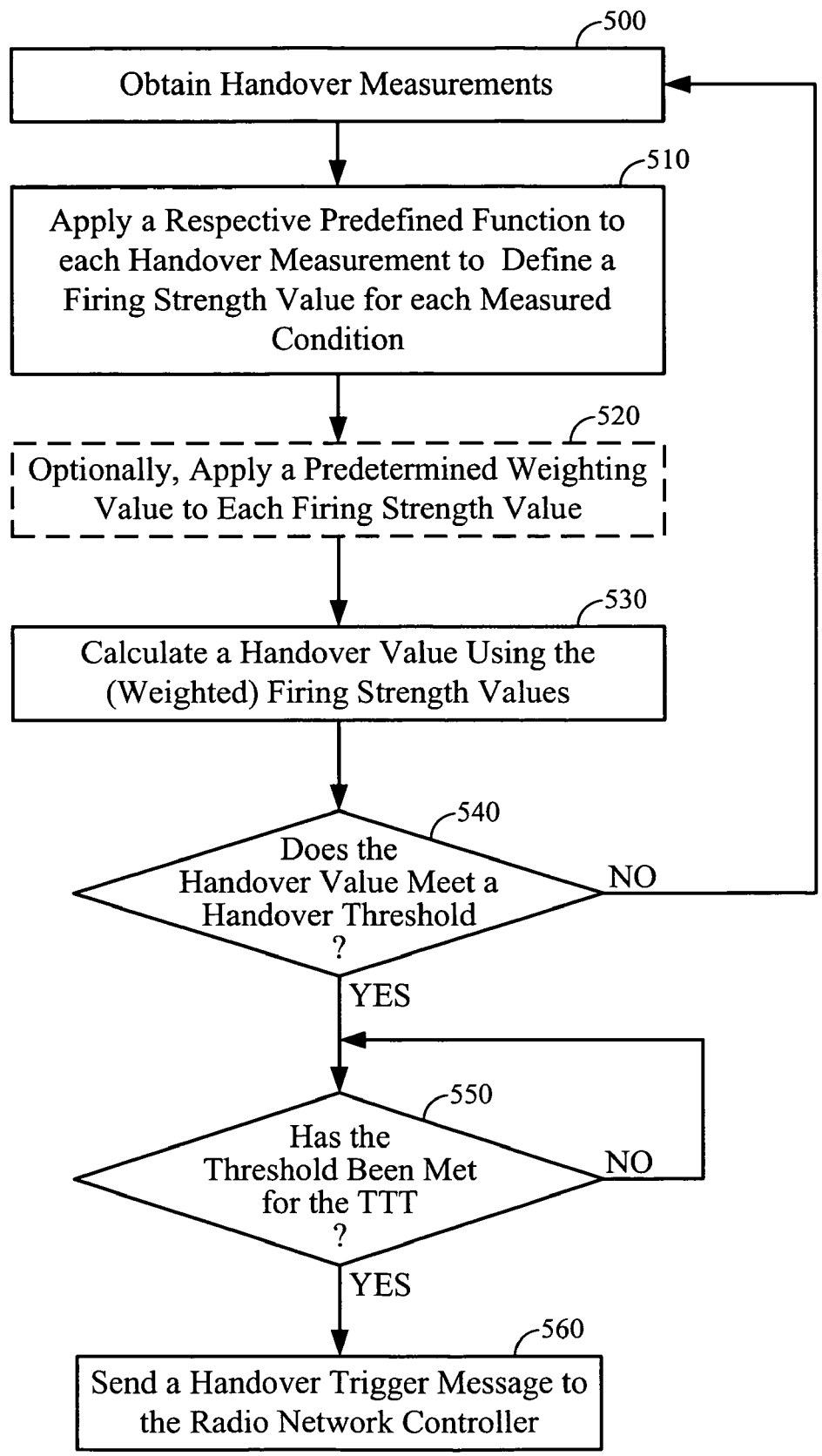
FIG. 11 is a flow diagram of a method for soft-decision based inter-RAT handover at a communication device, according to yet another aspect.

FIG. 11 provides a flow diagram of a method of soft-decision based handover triggering, in accordance with a present aspect. At Event 500, a communication device, such as a mobile terminal, obtains handover measurements for the current communications network and for the other communications network to which a call may be handed over. As previously noted the handover measurements may be obtained by monitoring current network radio conditions at the communication device or the measurements may be received from external network devices. Handover measurements may include, but are not limited to the UMTS system RSCP, UMTS system Ec/No, GSM system RSSI and the like.

At Event 510, a respective configurable function is applied to each respective handover measurement to generate a respective firing strength for each handover measurement. For example, in some aspects, the configurable function may be operable to determine a firing strength value between at least one of a first firing strength value and a second firing strength value. In these aspects, the first and second firing strength values will correspond to minimum and maximum function thresholds for the respective configurable function. The configurable function may be any sloped linear function or any non-linear function, or some combination thereof.

At optional Event 520, the firing strength values may be applied to a weighting value. Weighting values are applied to the firing strength values to provide relative handover determination priority to one or more handover measurements, or to increase or decrease the likelihood of the occurrence of handover triggering. In some aspects, for example, application of a weighting value may involve multiplying the firing strength by a weighting value factor. In aspects in which weighting values are not implemented, the configurable functions may be configured to provide for weighting of the handover measurements.

At Event 530, a handover value is calculated, which may include using the non-weighted or the weighted firing strengths. In some aspects, the calculation will involve applying a predetermined combining function to the firing strengths. For example, in one non-limiting case, the predetermined combining function comprises summing the weighted firing strengths to result in a summed handover value. Alternatively, the calculation that is implemented may be any other suitable mathematical calculation that results in a unitary handover value.

At Decision 540, a determination is made as to whether the handover value meets a handover threshold. As previously noted the handover threshold will include a handover value and a handover condition. The handover value will be a numeric value, in some aspects ranging between 0 and 1. The handover condition may include "less than", "greater than", "equal to", "less than and equal to", "greater than and equal to" or the like. As previously noted, the term "meets" a threshold is used herein to define the instance in which a measured value exceeds, equals or falls short of the predefined threshold value. If the handover measurement does not meet the handover threshold, the method returns to Event 500, where further handover measurements are obtained to subsequently define firing strengths and calculate another handover value.

If the handover value is determined to meet the handover threshold then, at Decision 550, a determination is made as to whether the handover threshold has been met during the predefined Time To Transfer (TTT). As previously noted, TTT defines the time period during which the handover threshold must be met for handover triggering to occur. For, example if the TTT is set to 10 seconds, the handover threshold must be met for 10 seconds in order for a handover trigger to be communicated to the network. A TTT of zero signifies that a single occurrence of a handover threshold being met prompts the sending of a handover triggering notification to the network. If the TTT is not met, the method will continue to monitor the calculated handover value as compared to the handover threshold to determine if the threshold is met for the TTT.

If the determination is made that the handover threshold has been met during the predefined TTT, at Event 560, a handover trigger message is communicated to a network device, such as a RNC, to initiate the handover process to transfer the call from the one RAT to the other RAT, such as from UMTS to GSM.

Figure 12:
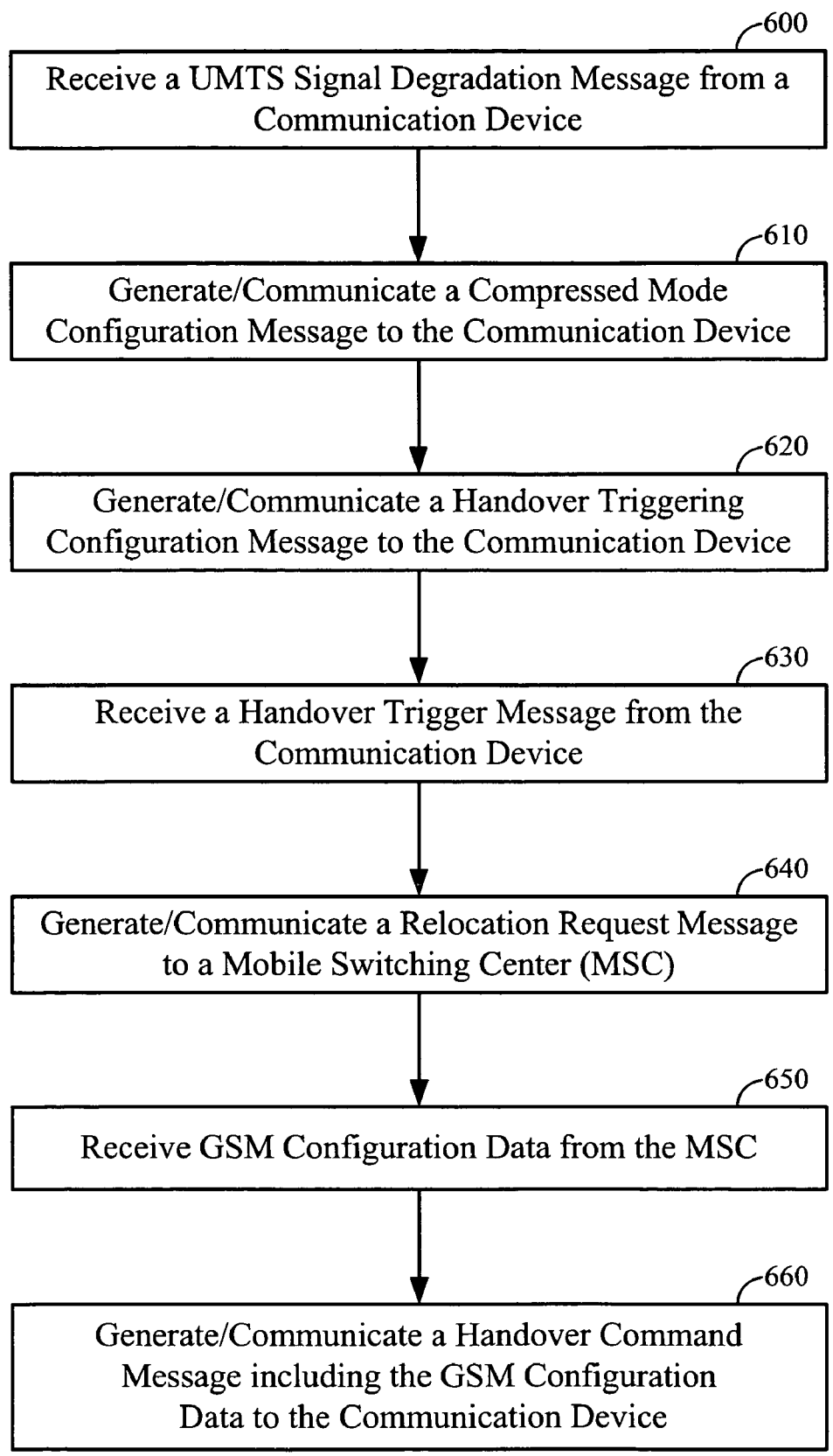
FIG. 12 is a flow diagram of a method for configuring soft-decision based inter-RAT handover measurements at a communication device, according to another aspect.

FIG. 12 is flow diagram of a method for configuring handover triggering at a network device. At Event 600, the network device, such as Radio Network Controller (RNC), receives a UMTS service degradation message from a communication device indicating that the UMTS service of a currently ongoing call has degraded to level that may warrant handover to the GSM network. According to the Radio Resource Protocol Specification 25.331, service degradation may be reported in the form of an event message, such as "Event2d", "Event1f", "Event6b" or any other event message that report the degradation of the UMTS service quality. UMTS service degradation may be characterized by one or any combination of a decrease in signal strength, an increase in interference-to-signal ratio or any other degradation in any other monitored UMTS measurement.

At Event 610, the network device generates a compressed mode configuration message and communicates the message to the communication device. The compressed mode configuration message is referred to as a Physical Channel Reconfiguration (PCRC) Message in the Radio Resource Protocol Specification 25.331. The compressed mode configuration data may include the frequency, duration and period associated with compression gaps. Additionally, the compressed mode configuration message may provide for the activation of the compressed mode at the communication device. The compressed mode is implemented to allow the communication device to tune away from UMTS and measure the performance of the GSM network. In alternate aspects, in which the communication device includes a full duplex dual mode receiver or the like, the device may be capable of transmitting/receiving on the UMTS and GSN side simultaneously. As such, in aspects which the communication device includes the full duplex dual mode receiver the need to go into a compressed mode to measure GSM is unwarranted.

At Event 620, once the network device has received confirmation from the communication device that the configuration of the compressed mode has been completed, the network device generates and communicates a handover triggering configuration message. The handover triggering configuration message is referred to as a Measurement Control Message (MCM) in the Radio Resource Protocol Specification 25.331. The handover triggering configuration message may include one or any combination of functions, thresholds, weighting values, time to trigger values or any other data suitable for configuration within the handover module executed at the communication device. The handover configuration message provides for dynamic configuration of the handover module during an ongoing communication call. By providing for dynamic configuration of the handover module the network administrator can manage the handover process and provide optimal utilization of network radio resources. Based on the received handover triggering configuration message, including the soft-decision based components described above, the communication device is able to determine whether or not to trigger a handover.

At Event 630, the network device receives a handover trigger message, based on soft-decision making, from the communication device indicating that the device has determined that handover to the GSM service is warranted. The handover trigger message is referred to as an Event e3a message in the Radio resource Protocol Specification 25.331. In response to the handover trigger message, at Event 640, the RNC communicates a relocation request to the Mobile Switching Center (MSC). At Event 650, in response to the relocation request, the RNC receives GSM configuration data from the MSC, such as GSM channel details and the like.

At Event 660, once the RNC has received the GSM configuration data, the RNC generates and communicates a handover command message to the communication device that includes the GSM configuration data. Upon receipt of the handover command, the communication device initiates the handover to the GSM service, thereby transferring the call from the UMTS network to the GSM network.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. In the alternative, the software module may comprise a computer readable medium storing instructions thereon, wherein one or more sets of instructions on the computer readable medium may define each step or action of any method or algorithm described herein.

While the foregoing disclosure shows illustrative aspects and/or embodiments, it should be noted that various changes and modifications could be made herein without departing from the scope of the described aspects and/or embodiments as defined by the appended claims. Furthermore, although elements of the described embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

Thus, the described aspects provide for soft-decision based handover triggering. By implementing configurable functions, soft-decision making allows for handover measurement limits to fall within a prescribed acceptable range and for the totality of the handover measurements to be used in making a final decision on handover. Thus, the currently described aspects provide for more flexible handover decision-making and better utilization of network radio resources. Further, by providing for the weighting of handover measurements, network administrators are provided the capability to place more or less emphasis on a selected handover measurement and, thus, better manage the handover process.

Many modifications and other aspects of the invention will come to mind to one skilled in the art to which this invention pertains having the benefit of the teachings presented in the foregoing descriptions and the associated drawings. Therefore, it is to be understood that the invention is not to be limited to the specific aspects disclosed and that modifications and other aspects are intended to be included within the scope of the appended claims. Although specific terms are employed herein, they are used in a generic and descriptive sense only and not for purposes of limitation.

What is claimed is:

1. A method for triggering Universal Mobile Telecommunications Service (UMTS) to Global System for Mobile (GSM) radio access technology handover in a communication device, comprising:
   obtaining at least one UMTS handover measurement and at least one GSM handover measurement;
   applying a respective configurable function to each UMTS handover measurement to define a respective UMTS firing strength value between a first UMTS firing strength value and a second UMTS firing strength value;
   applying a respective configurable function to each GSM handover measurement to define a respective GSM firing strength value between a first GSM firing strength value and a second GSM firing strength value;
   determining a handover value using each UMTS firing strength value and each GSM firing strength value;
   comparing the handover value to a configurable handover threshold; and
   generating a handover signal if the handover value meets the configurable handover threshold.

2. The method of claim 1, wherein obtaining at least one UMTS handover measurement and at least one GSM handover measurement further comprises obtaining a UMTS signal strength measurement, a UMTS signal energy to interference ratio measurement and a GSM signal strength measurement.

3. The method of claim 2, wherein obtaining a UMTS signal strength measurement, a UMTS signal energy to interference ratio measurement and a GSM signal strength measurement further comprises obtaining a UMTS Received Signal Code Power (RSCP) measurement, a UMTS received energy per chip divided by power density in the band (Ec/No) measurement and a GSM Received Signal Strength Indication (RSSI) measurement.

4. The method of claim 1, wherein applying the respective configurable function to each UMTS handover measurement further comprises applying the respective configurable function to each UMTS handover measurement to define the respective UMTS firing strength value between a predetermined minimum UMTS firing strength value and a predetermined maximum UMTS firing strength value, and wherein applying the respective configurable function to each GSM handover measurement further comprises applying the respective configurable function to each GSM handover measurement to define the respective GSM firing strength value between a predetermined minimum GSM firing strength value and a predetermined maximum GSM firing strength value.

5. The method of claim 1, further comprising applying a configurable weighting value to each respective firing strength value and wherein determining a handover value using each UMTS firing strength value and each GSM firing strength value further comprises determining a handover value using each weighted UMTS firing strength value and each weighted GSM firing strength value.

6. The method of claim 5, wherein the configurable weighting value is based on a cellular location of the communication device.

7. The method of claim 1, wherein determining a handover value using each UMTS firing strength value and each GSM firing strength value further comprising calculating a handover value by summing each UMTS firing strength value and each GSM firing strength value.

8. The method of claim 7, wherein determining a handover value using each weighted UMTS firing strength value and each weighted GSM firing strength value further comprises calculating a handover value by summing each weighted UMTS firing strength value and each weighted GSM firing strength value.

9. The method of claim 1, wherein generating a handover signal if the handover value meets the configurable handover threshold further comprises generating a handover signal if the handover value meets the configurable handover threshold during a time to trigger handover.

10. The method of claim 1, further comprising communicating the handover signal to a radio network controller.

11. A computer readable medium embodying instructions executable by a processor, the instructions comprising:
   a first set of the instructions for obtaining at least one UMTS handover measurement and at least one GSM handover measurement;
   a second set of the instructions for applying a respective configurable function to each UMTS handover measurement to define a respective UMTS firing strength value between a first UMTS firing strength value and a second UMTS firing strength value;

a third set of the instructions for applying a respective configurable function to each GSM handover measurement to define a respective GSM firing strength value between a first GSM firing strength value and a second GSM firing strength value;

a fourth set of the instructions for determining a handover value using each UMTS firing strength value and each GSM firing strength value;

a fifth set of the instructions for comparing the handover value to a configurable handover threshold; and a sixth set of the instructions for generating a handover signal if the handover value meets the configurable handover threshold.

12. At least one processor device, implemented in a communication device, configured to perform the operations of:

obtaining at least one UMTS handover measurement and at least one GSM handover measurement;

applying a respective configurable function to each UMTS handover measurement to define a respective UMTS firing strength value between a first UMTS firing strength value and a second UMTS firing strength value;

applying a respective configurable function to each GSM handover measurement to define a respective GSM firing strength value between a first GSM firing strength value and a second GSM firing strength value;

determining a handover value using each UMTS firing strength value, and each GSM firing strength value;

comparing the handover value to a configurable handover threshold; and generating a handover signal if the handover value meets the configurable handover threshold.

13. A communication device, comprising:

a computer platform including a processing engine and a memory unit; and a Radio Access Technology (RAT) handover module stored in the memory unit and executable by the processing engine, wherein the RAT handover module comprises:

measurement logic operable for obtaining at least one UMTS handover measurement and at least one GSM handover measurement;

UMTS firing strength logic operable for applying a respective configurable function to each UMTS handover measurement to define a respective UMTS firing strength value between a first UMTS firing strength value and a second UMTS firing strength value;

GSM firing strength logic operable for applying a respective configurable function to each GSM handover measurement to define a respective GSM firing strength value between a first firing strength value and a second GSM firing strength value;

handover value logic operable for determining a handover value using each UMTS firing strength value and each GSM firing strength value; and handover threshold comparison logic operable for comparing the handover value to a configurable handover threshold.

14. The device of claim 13, wherein measurement module operable for obtaining at least one UMTS handover measurement and at least one GSM handover measurement further comprises measurement module operable for a UMTS signal strength measurement, a UMTS signal energy to interference ratio measurement and a GSM signal strength measurement.

15. The device of claim 13, wherein measurement module operable for a UMTS signal strength measurement, a UMTS signal energy to interference ratio measurement and a GSM signal strength measurement further comprises measurement module operable for obtaining a UMTS Received Signal Code Power (RSCP) measurement, a UMTS received energy per chip divided by power density in the band (Ec/No) measurement and a GSM Received Signal Strength Indication (RSSI) measurement.

16. The device of claim 13, wherein the first UMTS firing strength value further comprises a predetermined minimum UMTS firing strength value, wherein the second UMTS firing strength value further comprises a predetermined maximum UMTS firing strength value, wherein the first GSM firing strength value further comprises a predetermined minimum GSM firing strength value, and wherein the second GSM firing strength value further comprises a predetermined maximum GSM firing strength value.

17. The device of claim 13, wherein the RAT handover module further comprises weighting logic operable for applying a configurable weighting value to each respective firing strength value.

18. The device of claim 17, wherein the handover value logic operable for determining a handover value using each UMTS firing strength value and each GSM firing strength value further comprises handover value logic operable for determining a handover value using each weighted UMTS firing strength value and each weighted GSM firing strength value.

19. The device of claim 13, wherein handover value logic operable for determining a handover value using each UMTS firing strength value and each GSM firing strength value further comprising handover value logic operable for calculating a handover value by summing each UMTS firing strength value and each GSM firing strength value.

20. The device of claim 17, wherein handover value logic operable for determining a handover value using each UMTS firing strength value and each GSM firing strength value further comprising handover value logic operable for calculating a handover value by summing each weighted UMTS firing strength value and each weighted GSM firing strength value.

21. The device of claim 13, where the RAT handover module further comprises handover signal generator logic operable for generating a handover signal if the handover value meets the configurable handover threshold.

22. The device of claim 21, wherein the handover signal generator logic operable for generating a handover signal if the handover value meets the configurable handover threshold further comprises handover signal generator logic operable for generating a handover signal if the handover value meets the configurable handover threshold during a time to trigger handover.

23. The device of claim 21, further comprising a communication module operable for communicating the handover signal to a radio network controller.

24. A communication device, comprising:

a means for obtaining at least one UMTS handover measurement and at least one GSM handover measurement;

a means for applying a respective configurable function to each UMTS handover measurement to define a respective UMTS firing strength value between a first UMTS firing strength value and a second UMTS firing strength value;

a means for applying a respective configurable function to each GSM handover measurement to define a respective GSM firing strength value between a first GSM firing strength value and a second GSM firing strength value;

a means for determining a handover value using each UMTS firing strength value and each GSM firing strength value;

a means for comparing the handover value to a configurable handover threshold; and a means for generating a handover signal if the handover value meets the configurable handover threshold.

25. A method for configuring Universal Mobile Telecommunications Service (UMTS) to Global System for Mobile (GSM) radio access technology handover at a network device, comprising:

providing for a set of function thresholds for each of one or more UMTS handover measurements and each of one or more GSM handover measurements;

generating a measurement control message (MCM) that includes the selected function thresholds; and communicating the MCM to a communication device, wherein the set of selected function thresholds are operable for application to a respective configurable function for each UMTS handover measurement and each GSM handover measurements.

26. The method of claim 25, further comprising providing for a weighting value for each of the one or more UMTS handover measurements and each of the one or more GSM measurements.

27. The method of claim 26, wherein generating a measurement control message (MCM) that includes the selected function thresholds further comprises generating a measurement control message (MCM) that includes the selected function thresholds and the selected weighting values.

28. The method of claim 26, wherein communicating the MCM to a communication device, wherein the set of selected function thresholds are applied to a respective configurable function for each UMTS handover measurement and each GSM handover measurements further comprises communicating the MCM to a communication device, wherein each selected weighting value is applied to a respective UMTS and GSM firing strength value that results from applying the respective configurable function to each of the UMTS handover measurements and GSM handover measurements.

29. The method of claim 26, wherein the MCM further includes instructions to activate a compressed mode at the communication device.

30. The method of claim 29, wherein the compressed mode provides for the communication device to obtain GSM handover measurements.

31. A computer readable medium embodying instructions executable by a processor, the instructions comprising:

a first set of the instructions for providing for a set of function thresholds for each of one or more UMTS handover measurements and each of one or more GSM handover measurements;

a second set of the instructions for generating a measurement control message (MCM) that includes the selected function thresholds; and a third set of the instructions for communicating the MCM to a communication device, wherein the set of selected function thresholds are applied to a respective configurable function for each UMTS handover measurement and each GSM handover measurement.

32. At least one processor device, implemented in a network device, configured to perform the operations of:

providing for a set of function thresholds for each of one or more UMTS handover measurements and each of one or more GSM handover measurements;

generating a measurement control message (MCM) that includes the selected function thresholds; and communicating the MCM to a communication device, wherein the set of selected function thresholds are operable for application to a respective configurable function for each UMTS handover measurement and each GSM handover measurements.

33. A network device, comprising:

a computer platform including a processing engine and a memory unit;

a Radio Access Technology (RAT) handover module stored in the memory unit and executable by the processing engine, wherein the RAT handover module comprises:

a function threshold selector operable for providing a set of function thresholds for each of one or more UMTS handover measurements and each of one or more GSM handover measurements; and a Measurement Control Message (MCM) generator operable for generating a measurement control message (MCM) that includes the function thresholds; and a communications module operable for communicating the MCM to a communication device, wherein the set of selected function thresholds are applied to a respective configurable function for each UMTS handover measurement and each GSM handover measurements.

34. The network device of claim 33, wherein the RAT handover module further includes a weighting value selector operable for providing a weighting value for each of the one or more UMTS handover measurements and each of the one or more GSM measurements.

35. The network device of claim 34, wherein the a Measurement Control Message (MCM) generator operable for generating a measurement control message (MCM) that includes the function thresholds further comprises a MCM generator operable for generating an MCM that includes the weighting values.

36. The network device of claim 34, wherein the communications module operable for communicating the MCM to a communication device, wherein the set of selected function thresholds are applied to a respective configurable function for each UMTS handover measurement and each GSM handover measurements further comprises a communication module operable for communicating the MCM to a communication device, wherein each weighting value is applied to a respective UMTS and GSM firing strength value that results from applying the respective configurable function to each of the UMTS handover measurements and GSM handover measurements.

37. The network device of claim 33, wherein the MCM generator is further operable for generating a measurement control message that includes instructions to activate a compressed mode at the communication device.

38. A network device, comprising:

a means for providing for a selection of a set of function thresholds for each of one or more UNITS handover measurements and each of one or more GSM handover measurements;

a means for generating a measurement control message (MCM) that includes the selected function thresholds; and a means for communicating the MCM to a communication device, wherein the set of selected function thresholds are applied to a respective configurable function for each UMTS handover measurement and each GSM handover measurements.

* * * * *

UNITED STATES PATENT AND TRADEMARK OFFICE
CERTIFICATE OF CORRECTION

PATENT NO. : 7,643,830 B2
APPLICATION NO. : 11/488745
DATED : January 5, 2010
INVENTOR(S) : Catovic et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 705 days.

Signed and Sealed this

Twenty-first Day of December, 2010

David J. Kappos
*Director of the United States Patent and Trademark Office*